US008366353B2

(12) United States Patent
Scott

(10) Patent No.: US 8,366,353 B2
(45) Date of Patent: Feb. 5, 2013

(54) PNEUMATIC TRANSPORT SYSTEM WITH RECEPTION CHAMBER ASSEMBLY WITH ACCESS COVER SEAL ASSEMBLY

(76) Inventor: Lowell Scott, Burlington, KY (US)

( * ) Notice: Subject to any disclaimer, the term of this patent is extended or adjusted under 35 U.S.C. 154(b) by 775 days.

(21) Appl. No.: 11/806,007

(22) Filed: May 29, 2007

(65) Prior Publication Data

US 2008/0298907 A1 Dec. 4, 2008

(51) Int. Cl.
*B65G 51/20* (2006.01)
(52) U.S. Cl. ............................ 406/84; 406/110; 406/179
(58) Field of Classification Search .................. 406/110, 406/111, 112, 148, 149, 176, 179, 84
See application file for complete search history.

(56) References Cited

U.S. PATENT DOCUMENTS

| | | | |
|---|---|---|---|
| 1,586,634 A | | 6/1926 | MacLaren et al. |
| 2,763,446 A | | 9/1956 | Hanson |
| 3,294,342 A | * | 12/1966 | McClure et al. ................. 406/19 |
| 3,305,192 A | | 2/1967 | Todt et al. |
| 3,711,038 A | | 1/1973 | Van Otteren |
| 3,761,039 A | | 9/1973 | Hazell |
| 3,778,006 A | * | 12/1973 | Martin ........................... 406/112 |
| 3,790,101 A | | 2/1974 | Weissmuller |
| 3,907,231 A | | 9/1975 | Kreiner |
| 3,976,264 A | | 8/1976 | Ekama et al. |
| 3,985,316 A | * | 10/1976 | Weissmuller ................. 406/110 |
| 4,047,677 A | * | 9/1977 | Hochradel et al. ............. 406/110 |
| 4,180,354 A | | 12/1979 | Greene |
| 4,184,792 A | | 1/1980 | Turnbo |
| 4,189,261 A | * | 2/1980 | Kelley et al. ................... 406/112 |
| 4,234,271 A | * | 11/1980 | Kalina ............................... 406/1 |
| 4,256,418 A | * | 3/1981 | Stangl ........................... 406/112 |
| 4,313,700 A | | 2/1982 | Gomez et al. |
| 4,315,704 A | | 2/1982 | Kelley et al. |
| 4,343,574 A | * | 8/1982 | Anders ........................... 406/13 |
| 4,352,603 A | * | 10/1982 | Anders ........................... 406/27 |
| 4,395,164 A | * | 7/1983 | Beltrop et al. .................. 406/74 |
| 4,437,797 A | | 3/1984 | Kardinal |
| 4,437,799 A | | 3/1984 | Liu et al. |

(Continued)

OTHER PUBLICATIONS

Co-pending U.S. Appl. No. 11/802,995, filed May 29, 2007 and sharing a common inventor.

(Continued)

*Primary Examiner* — Joseph A Dillon, Jr.
(74) *Attorney, Agent, or Firm* — Smith, Gambrell & Russell LLP

(57) ABSTRACT

An access chamber assembly for use in a pneumatic transport system with a sealing arrangement that provides an intended bearing clearance relative to an access door device which is rotated between an open, access state and a closed state. The bearing clearance allows for radial adjustment of the door while being rotated between states of being fully closed and fully open to avoid binding and seal friction noise. When a seal status is desired, as when the access door is closed and the access chamber is in a pressurized state (such as when a carrier is being braked to a stop state in the access chamber), the seal arrangement provides for a tight seal as the access door device is radially adjusted by the pressure to take up the clearance, at a diametrically opposed side, which movement also increases a seal enhancement effect provided by the seal components surface interrelationship as with door bar seals having a slight taper that provides an increased seal wedge effect as the access door is radially pushed out by the pressure against a second seal component such as a fixed lip seal of a carrier support pocket.

20 Claims, 21 Drawing Sheets

U.S. PATENT DOCUMENTS

| | | | |
|---|---|---|---|
| 4,462,721 A * | 7/1984 | Anders et al. | 406/112 |
| 4,466,761 A * | 8/1984 | Beltrop et al. | 406/74 |
| 4,512,688 A | 4/1985 | Hochradel | |
| 4,661,026 A * | 4/1987 | Carlier | 406/74 |
| 4,792,263 A * | 12/1988 | Podoll | 406/189 |
| 4,913,598 A | 4/1990 | Dozier | |
| 4,930,941 A * | 6/1990 | Willey et al. | 406/10 |
| 4,971,481 A | 11/1990 | Foreman | |
| 4,984,939 A * | 1/1991 | Foreman et al. | 406/84 |
| 5,127,773 A * | 7/1992 | Foreman et al. | 406/179 |
| 5,131,792 A * | 7/1992 | Grosswiller et al. | 406/112 |
| 5,147,154 A | 9/1992 | Scott | |
| 5,209,609 A * | 5/1993 | Lang | 406/112 |
| 5,211,513 A | 5/1993 | Scott | |
| 5,217,329 A * | 6/1993 | Lang | 406/176 |
| 5,299,891 A * | 4/1994 | Grosswiller et al. | 406/112 |
| 5,356,243 A * | 10/1994 | Vogel | 406/74 |
| 5,368,417 A * | 11/1994 | Benjamin et al. | 406/111 |
| 2,698,721 A | 1/1995 | Van Otteren | |
| 5,562,367 A | 10/1996 | Scott | |
| 5,564,868 A * | 10/1996 | Vogel et al. | 406/112 |
| 5,584,613 A * | 12/1996 | Greene et al. | 406/19 |
| 5,735,644 A * | 4/1998 | Grosswiller et al. | 406/112 |
| 6,039,510 A * | 3/2000 | Greene et al. | 406/21 |
| 6,146,057 A * | 11/2000 | Gromley et al. | 406/10 |
| 6,652,198 B2 * | 11/2003 | Nickoson | 406/13 |
| 7,153,065 B2 | 12/2006 | Lowell | |
| 7,220,082 B1 * | 5/2007 | Christian et al. | 406/112 |
| 7,234,898 B2 * | 6/2007 | Brown | 406/110 |
| 7,284,934 B2 * | 10/2007 | Hoogers | 406/176 |
| 7,314,339 B1 * | 1/2008 | Christian et al. | 406/112 |
| 8,011,862 B2 | 9/2011 | Scott | |

OTHER PUBLICATIONS

Hamilton Air, "Hamilton-Drive-Up Systems set the standard for remote customer transactions", Brochure No. 9495A HS KM, Jun. 2005.

Hamilton Air, "Hamilton Air HA-1000 The Modular System in Remote Drive-Ups", Brochure No. 6979D KM May 2005.

Hamilton Air, "The Hamilton Air HA-45 overhead Remote Drive-Up system", Brochure No. 9053D.HS KM2.5, Jun. 2005.

Hamilton Air, "Tell-R-TVTM Systems let you tailor an audio/video communications system to fit your unique needs", Brochure No. 7311B.HS Nov. 2003.

Hamilton Air, Hamilton's CM-2 "Line of Sight" teller terminal, Brochure No. 8461 KM 2.5K, May 1998.

Hamilton Air, Hamilton's Digital Communications System—can deliver the ultimate communications clarity, Brochure No. 9166B HS, Apr. 2004.

Hamilton Air, Hamilton's HA-47 is designed to service retail and commercial customers, Brochure No. 9490 KM, Nov. 2003.

Hamilton Air, "Hamilton's HA-33 Large Capacity commercial drive-up system", Brochure No. 8852A KM, Sep. 2001.

Hamilton Air, "Hamilton HA-22 Commercial Deposit Drive-Up", Brochure No. WS7260, Aug. 1993.

Hamilton Air, "Hamilton's HT-19 "Point-to-Point" single-tube pneumatic delivery system", Brochure No. 9628 HS KM2.5, Apr. 2005.

Hamilton Air, "HT-15 Pneumatic Tube System", Brochure No. 7356A.HS KM 2.5, Mar. 2002.

* cited by examiner

PNEUMATIC TRANSPORT SYSTEM WITH RECEPTION CHAMBER ASSEMBLY WITH ACCESS COVER SEAL ASSEMBLY

FIELD OF THE INVENTION

The present invention relates to a pneumatic transport system with an access chamber assembly having an access cover seal assembly, as in a banking teller sub-assembly with access door, and access door seal assembly.

BACKGROUND OF THE INVENTION

The prior art features pneumatic carrier transport systems with carrier reception chambers for receiving a carrier. An example is found in bi-directional carrier transport systems in which a bank teller carrier (a transport tube cylinder) is transported back and forth between a customer station and a teller station. Examples of bi-directional carrier transport systems are found in U.S. Pat. Nos. 5,147,154; 5,211,513; 5,562,367; 7,153,065, each to the current inventor Lowell Scott and sharing a common assignee with the present assignee, Hamilton Safe Company of Fairfield, Ohio, USA. In such systems, the carrier reception chambers need to be sufficiently sealed off to achieve the desired pressure level state at the desired time (e.g., a pressurized state is formed in the reception chamber as the carrier is braked to achieve a soft landing in that reception chamber). A low pressure vacuum state is formed ahead of the carrier and/or a higher pressurized state is formed behind the carrier to place the carrier in motion within the carrier transport system as through use of a turbine box. Once the carrier is properly located within the reception chamber and the system is placed in user access mode (e.g., through release of a pressure within the reception chamber as in a return to an atmospheric pressure state or into a "static" state by a dissipation of air behind a carrier following braking) a user (e.g., bank teller) accesses the transport carrier by opening an access cover. This typically entails rotating a cylindrical section of a support housing for receiving the carrier. Thus, the rotating cylindrical section represents an access door, as in an access door support cylinder with corresponding access opening to be covered by the access door.

To achieve the desired pneumatic seal levels, particularly at the time the transport system is pressurized, the access doors of the prior art are connected with an access door support in a tight seal arrangement as in one where the access cover is in an interference seal fit relative to a sealing device provided on the access door support when at the closed and open states and in an interference fit relative to the bearing support provided by an access door support structure on which the access door rides in going between fully open and fully closed states. This interference contact leads to difficulty in user access as the access cover can be difficult to open under such a seal retention arrangement. In addition, even if the cover moves relatively smoothly in going from a closed to open state or vice versa, there is a associated with that movement a squeaking or moaning noise due to the interrelationship of the bearing and/or sealing structure relative to the access cover during movement of the access cover. Many prior art seals are also often made of a material that is designed with a high degree of elasticity to provide a good sealing function, but which material is prone to relatively rapid wear due to the tight fit relationship. Thus, after a period of use, the seal assembly can degrade and so too then does the carrier transport efficiency due to pressure leakage, for example. Moreover, various types of interference seals have been utilized that are formed of various materials such as steel, aluminum, and plastic. These types of seals present their own problems such as having to either be initially squeaky tight then loose over time and/or hard to manufacture to provide a good seal quality. There are also tangential seals which also are difficult to seal tight and thus generally necessitate the addition of some sort of detent to hold the door closed against the seal.

SUMMARY OF INVENTION

The present invention is inclusive of a reception or access chamber assembly having a smooth riding and low noise generating access cover, an access cover support and an access cover seal assembly. The access chamber assembly is suited for use in a pneumatic carrier transport system as in a bi-directional carrier transport system such as a drive-through banking carrier transport system having teller(s) and customer(s) stations. The access chamber assembly of the present invention is also well suited for use in a point-to-point pneumatic transport system such as a different level material transport system for use in a multi-story building or building(s). This includes, for example, access chamber assemblies with rotating access covers and associated sealing means.

The subject matter of the present invention is inclusive of an access chamber assembly having an access cover and access cover support with the access cover support having, for example, first (e.g., upper and/or first side) and second (e.g., lower and/or second side) bearing surfaces with bearing regions that are intentionally designed with excessive clearance relative to sections of the access cover device being received by those bearing regions. The excessive clearance formed in the bearings facilitates cover movement in all desired movement directions of that cover. In addition, the sealing means for sealing the access cover or door is preferably comprised of a combination of seal components as in a seal combination that includes an access cover associated first seal component and an access cover support associated second seal component designed for sealing contact. The sealing means is also preferably provided with pitched seal section(s) as, for example, a pitched cover side bar sealing surface(s) designed to come in sealing contact with a neutral, preferably fixed end seal(s) of the supporting frame structure of the cover support (e.g., a carrier pocket sub-assembly with fixed free edge lip seals).

For example, an embodiment of the invention comprises an access cover device that includes a partial-cylinder door facing section which rotates about a vertical axis with an associated frame structure as the door facing support. As part of the seal assembly or seal means there is also preferably formed two pitched cover seal bars that run vertically the full length of the opposite side edges of the door facing (e.g., a transparent or translucent semi-cylindrical plastic cover) and which are dimensioned for sealing contact with corresponding left and right frame end lip seals of the cover support during desired states (as in when the reception chamber is in a pressurized state such as when a carrier is being braked by the build up of pressure relative to trapped air leading to the access chamber). The two pitched seal bars provided at the ends of the moving access door have angled surfaces that are arranged in a fashion such that when the access door is in the closed state and the access chamber is pressurized, the access door moves radially outward away from the center of the access chamber (made possible due to the intentional bearing excess clearance) causing the bearing surfaces to increase in contact pressure so as to generate an increase in the seal level. For example, with the interior seal bar surfaces converging in a radial inward direction, when the access door is pushed radially outward, due to the internal access chamber pressurization, the sloped interior surface of the bar seals increase the seal level when pushed radially outward such that an increase in pressure leads to even a greater seal compression relationship. This also avoids having to use soft elastomeric door edge seals since the shape of the door bar seals are able to increase the seal level without reliance on elastomeric compression.

Thus, under the present invention an improved sealing and access or closing movement relationship is provided between the access cover and the access cover support based on the bearing relationship between the access cover and its support having a degree of intended play which intended play is removed upon pressurization of the access chamber interior and returns when the pressure level is reduced in the access chamber. Moreover, the shape of the seal associated with the access door is designed to place a greater thickness of material between the outer bearing limit and an interior corresponding, preferably fixed in position, seal device as the access cover device is moved radially outward due to an increase in pressure level in the access chamber.

The access chamber assembly of the present invention is suited for use in a carrier transport system which transport system includes a ready to access state wherein the pneumatic transport system is in, for example, a static mode (e.g., a non-pressurized or depressurized state) such that a transport carrier can be accessed (e.g., the system is in a state which allows the operator to safely gain access to the interior of the access chamber to either replace or remove the carrier). In this static mode, the access cover is loosely received within the excess bearing clearance provided as in clearance regions in both upper and lower bearing rotation tracks. In one embodiment, the loose contact bearing relationship between the pitched, externalmost wall of the seal bars and the fixed frame during a static mode in the transport system allows for ready adjustment of the access door device. However, the pitched seal bars are also preferably designed to alter their positional relationship relative to the access cover support seal counterparts as to provide for an increase in the adjustment capability of the access cover device relative to the excess clearance bearing tracks when the access cover device is moved away from an access "closed off" state. In other words, when in the access cover closed state, the bearing clearance relationship provides for a low level seal or more preferably a close-to-seal relationship (an intended less than 2 mm spacing and more preferably 1 mm or less spacing between the respective seal components) between the closed access door and its supporting structure based on the bearing clearance capability and the seal positioning. Thus, when the transport system is in its static state the access cover device can readily be initially adjusted out of its lower level seal state (or near to seal state) in going from the closed access cover state toward an open access cover state.

The pre-designed bearing clearance, coupled with the pitched seal bar configuration, also renders continued opening movement even easier in going from the initially open to a fully open carrier access state (as the access cover can even more freely adjust in the radial bearing clearance area once the corresponding seal components clear each other to allow for further separation in space of the components of the access cover relative to the components of the access cover support). For example, a near seal arrangement may be 1 mm or less in intended clearance while a full clearance would be greater than that intended spacing as in a 1 mm to 3 mm clearance spacing once the corresponding seal components are no longer radially aligned due to relative movement of the access cover and access cover support. Also, the seal configuration is designed to help achieve that increase in bearing clearance at an early stage of opening of the access cover to help in access cover shifting for added clearance for an opposite side seal component set (in other words, the pitched surface of an opposing seal component can lead to a lessening of spacing while the diametrically opposing one is increasing in spacing which lessening can be neutralized by an ability of the access cover to shift within its excessive clearance bearing track).

On the other hand, when a good seal is needed as during, for example, a non-static carrier braking sequence wherein the access chamber's pressure increases, a good pressure seal between the closed access cover and access cover support is ensured by the sealing means of the present invention and the radial clearance. That is, the combination of the sealing means of the present invention and the radial clearance provides for an initial radial adjustment of the seal components into initial contact (as the bearing clearance is removed) followed upon by an enhanced seal contact relationship between the sealing means components as the pitched seal components are shaped as to increase the seal contact with a corresponding seal region of the cover frame structure at a time of access chamber pressurization. For instance, by the presentment of more seal material within a limited space between the limit of the radial clearance and the corresponding seal component relative to the radial adjustment of the cover caused by the access chamber pressure there is achieved a greater sealing effect beyond that provided just by radial pressure induced comparison. The pitch degree for the seal surface(s) of the seal components providing the increased sealing level is preferably from 2 to 8 degrees and more preferably 3 to 6 degrees with 3 degrees being well suited for a preferred embodiment. The pitch degree chosen provides for the noted seal increase during pressurization while providing for ready clearance during adjustment of the access cover during a static state in the transport system.

That is, in a preferred embodiment a pair of opposite side pitched seal bars are configured or designed to cause, at a time of access chamber pressurization, the access cover to assume a greater compressed contact seal relationship than would occur if it were not for the pitched arrangement as by, for example, a wedge effect brought about by a combination of the pitched surfacing of the seal, the ability of the access cover to radially adjust and the radial adjustment generated by an increase in pressure in the access chamber. Also, with increased pressure there is generated even a greater seal as more seal material is presented or compressed within a limited space. This is achieved without reliance on softer elastomeric material although the present invention includes within its scope the use of softer elastomeric seal material (although less preferable in many uses of the present invention from the standpoint of loss of durability and increasing the potential for a friction drag adjustment of the access cover when such adjustment is desired). Instead, a low friction, relatively hard plastic seal is preferred for many uses under the present invention.

On the other hand, the pitched arrangement of the seal means does not interfere with the opening when in a static transport system and the seal mean design further provides for access to more of the excess bearing clearance just after the access cover is moved out from a fully closed state. That is, there is enhanced by the pitched seal configuration and general radial clearance a non-interference movement of the access door device just after passing out of its closed state all the way to a fully open state. For instance, the pitch design of the sealing means, relative to one pair of corresponding seal components, coupled with the overall bearing clearance, provides for an increase in clearance spacing at that one side upon initial relative movement of the seal components of that sealing contact pair. This relationship then allows for a shifting of the access cover over to a less interfering state at the opposite set of seal components where the pitch angle is leading to a lessening in spacing. This increase in clearance at one side of the access door and the general clearance provided between the access cover and its bearing support ensures, upon shifting of the access door within that added clearance, sufficient clearance at the opposite set of seal components having a taper arrangement that would otherwise be headed toward seal (or greater seal) contact due to its opposite taper leading toward a lessening of space upon relative movement of the access cover and access cover support. This situation arises, for example, when there a divergent set of pitched interior walls for diametrically opposed bar seals wherein as one taper leads to an increase in spacing relative to an adjacent lip seal during relative rotation, the other seal bar's interior surface leads to a lessening in spacing relative to an adjacent lip seal due. However, the excessive radial bearing clearance allows for the access cover to shift within that increased clearance space provided on the increasing spacing side, which in turn generates sufficient spacing at the opposite side to compensate for the reduction in clearance spacing caused by the other tapered side such that a non-interrupted adjustment of the access cover is possible. Also, once the seal components no longer are radially opposed to one another there is full freedom of radial shifting within the bearing clearance without abutment, as one seal component is free to go radially internally of the circumferential path extending into point contact with the other seal component within a seal set (and vice versa).

To further help explain the relationship between the access door device and its supporting structure and the various sealing states reference is made below to certain stages of rotation in the access door device in going from the closed state to the fully open state (or carrier access state). Relative to the closed state, a discussion is also provided as to the access cover device being in a static (or non-pressurized access chamber) state and a pressurized state in the access chamber.

In the closed (or 0°) state the access door is in a position which covers over the access opening. When in a closed state and when the access chamber is in a "static" state, the access chamber is preferably at a relatively lower pressure state as in a pressure level close to, at or below atmospheric pressure level. In this way after a shut down of a transport system blower and sufficient dissipation of a carrier driver pressure or braking higher pressure level in the access chamber of the transport system, the seal means is preferably in a close to or light intermediate seal level state. When the seal means is at this "intermediate" seal relationship state, there is preferably either a minor degree of sealing contact between the seal members associated with the adjustable access door itself (e.g., "seal bars") and the opposite seal member relied upon to form a seal such as seal strips (or "seal lips") formed on edges of the access door support structure (e.g., a carrier pocket structure with two lip seals formed on opposite free edges of a semi-cylindrical carrier pocket support structure) or a close-to-seal state wherein the respective seal members are not in direct contact but close to contact (e.g., 2 mm or less with about a 1 mm spacing being preferred). Further, in this closed, static state, the bearing clearance is placed in an intermediate state as some but preferably not all of the clearance is taken up by having an intermediate region of the sloped surfaces of the respective door seal bars adjacent the fixed neutral seal strips associated with the fixed carrier pocket. In other words there is a limit in the radial shifting of the access door before the radially aligned seal components come in contact if they are not already in a light seal contact state.

A full seal arrangement is achieved when the access cover device is in closed state and with the access chamber in a pressurized, non-static state (as may occur when a carrier tube is traveling toward the access chamber and being braked for a soft landing in the access chamber by a volume of air trapped in the access chamber region of the transport system and increasing in pressure as the moving carrier reduces the volume of air in front of it while only a limited amount of dissipation of the trapped air is allowed based on the carrier and transfer tube interrelationship). In this mode, with the access cover door closed and the access chamber pressurized, the seal means is placed at a higher or tight seal state (e.g., a maximum seal state) with the access door having been radially adjusted due to the pressure increase and the relative surfaces of the abutting seal components of the seal means having been placed in an increased state of compression due, in part, to the pressure state in the chamber but also preferably based in part on the relative shape of the seal components as by an increased wedge effect provided by the relative surfaces of the abutting seal components. Also, while in this closed and pressurized state, there is no clearance play as the radial outward force of the access chamber pressure removes any bearing surface clearance since the access chamber is moved radial outward to take up the intentional bearing clearance.

When the access chamber is in a static state and the access door is moved from its closed state toward a partial open state (e.g., a 10° rotation) the seal level is at a lower state and the radial bearing clearance, which facilitates a non-binding further rotation of the access cover device, is increased at least on one side. That is, when the access cover device is at the initiation of an access opening state, the seal level drops or further drops and a region of the clearance play moves to a higher level (as the relative distance between the fixed seal component and the tapered interior surface of the door seal bars has increased due in part to the taper of a seal bar's interior surface).

Thus, when the access door is grabbed by the user and shifted in position from the above-noted initial closed, static transport system state (the 0° rotation state) to, for example, the initial open state in the access door (e.g., a 10° clockwise rotation state when looking down) the pitched end seal bars of the access door are positioned so they can sufficiently clear the end seals of the frame structure upon further rotation. This clearance, despite tapered surfaces, is achieved with the assistance of the radial bearing clearance play. Spacing begins to increase on one seal component set side based on the tapered surface configuration of the pitch seal component on that one side, and which clearance on that one side then allows for a shifting in the clearance spacing toward an opposite side to ensure tapered surface clearance at that opposite side. That is, the taper on one seal component set side enables an initial expansion of relative spacing between adjacent seal components from an initial light seal or close to seal spacing (see the 1 mm spacing discussion above) to one greater than that upon rotation of the pitched seal surface relative to the access cover support. This taper based spacing expansion at the one side allows for sufficient radial clearance freedom to provide for an expansion of what is otherwise a decreasing space at the opposing tapered seal surface and the clearance of the tapered surface at the decreasing spacing side following compensating shifting of the access cover in the excess bearing clearance.

Once the pitched seal bar fully circumferentially clears its corresponding lip seal then the full radial bearing clearance is rendered available as there is no potential contact between corresponding seal components as the access cover is further opened. That is, the rotation from the 0° state to the 10° state initiates an increase in spacing while further rotation and access cover shifting in the bearing clearance enables continued rotation with full access to the clearance play. For example, once the access cover is rotated past the 10° or so initial opening state and the shifted edge seals rotate by the respective lip seals, the access cover can then be shifted radially back and forth within the excess bearing clearing without seal component abutment which ensures smooth, low-interference travel during continued rotation. Hence, there is avoided the interference binding and/or squeek associated with prior art access cover seals.

The free rotation is therefore facilitated by the clearance access arrangement between the access cover and access cover support bearing design, while a suitable rotation stop is provided at a desired point to discontinue the ability to rotate the access cover device. A suitable stop location can be a 170° rotation point off from the above noted 0° rotation state. At this 170° rotation point, the level of clearance is similar or greater to that at 10° since the 170° rotation block precludes the corresponding seal components of the seal means from coming back together in radial alignment and into the noted intermediate clearance play state.

Once the transport carrier is inserted for transport from the present reception chamber to a different location, the access cover is returned by way of an opposite rotation (e.g., counterclockwise) to the original 0° state which is a closed state for the access cover. As with the full open state, a stop is preferably provided as a limit to rotation travel as in a stop provided on the access cover support structure. When the access cover is in the 0° closed state the angled vertical cover seal bars are in close proximity to the end seals of the cover support frame structure. The radial clearance provided by the bearing arrangement between the cover and cover support provides for the free rotation and ready positioning of the cover in the closed state at a time prior to pressurization of the transport system. Thus, the bar seals and end seals are preferably placed in a light seal or close to a seal contact relationship when the access door device is in a closed state with the transport system being in a non-pressurized state or in a static state. For a close to sealing initiation state, sealing is started, however, immediately upon a pressurization in the reception chamber.

For example, a no seal contact relationship during a static or non-pressurized state in the transport system is suitable for the reception chamber when utilizing a system that relies on the flow generator to move the carrier by generation of a low pressure or vacuum state ahead of the carrier and atmospheric air is used as the driving force behind the carrier (as in going from a "teller" station to a "customer" station with a turbine above the customer station) since the vast majority of the driving atmospheric air comes through the check valve below the carrier while in the reception chamber with feed from the atmospheric breather tube. The potential for some atmospheric pressure air leakage past the access door at this step is thus not problematic. It is further noted that, in general terms, some banking carrier transport systems have a "teller unit" and a "customer unit" with the customer unit provided on an island adjacent a drive-up lane that is a different design than the teller unit as in one having an automatic motor driven door on the arrival/pressure chamber. Thus, these customer units do not suffer to as great an extent the problems associated with manually open access covers as more commonly found on teller access chamber units that can be provided at either a teller station, a customer station or both (e.g., providing of an access cover that can be easily opened by all types of customers utilizing the system such as young and old). The features of the present invention can nonetheless have utility in either a "customer unit" or "teller unit" setting, as even a motor driven access cover can benefit from the inventive features of the present invention. Also, reference to a teller unit herein is not limited to a banking teller station but can be also used at a customer station. For example, transfer systems under the present invention are also inclusive of having a teller reception chamber assembly at opposite transfer points in the system. For example, banking transfer system can have a manual teller reception chamber assembly at opposite ends and dispense with the automated customer unit like that described above. A system featuring two teller reception chamber assemblies (preferably each manual and preferably each of a common "teller" design) is referenced as a point-to-point system under the present invention. The teller reception chamber assemblies at opposite ends of a point-to-point transfer systems featured under the present invention can also be of a common configuration.

An example of a transport system and an access chamber assembly going into a pressurized state can be seen by reference to U.S. patent application Ser. No. 11/802,995 filed on the same date as the present application and entitled "Carrier Transportation System With Brake Valve Device Proximate To A Carrier Receiver" (now U.S. Publication No. 2008/0298906) with an embodiment thereof depicted in FIGS. 1A and 1B of the present application. This co-pending application is incorporated herein by reference.

The present invention includes an access chamber banking assembly well suited for use in bi-directional carrier transport systems wherein the carrier is sent from the customer station to the teller station with the access cover device closed and wherein the air ahead of the carrier is exhausted through the flap check valve above the teller station. As the carrier passes the check valve it seals off the teller station's carrier reception chamber from above such that air pressure begins to rise in the teller station reception chamber. This increase in pressure forces the access cover radially outward which, due to the bearing clearance provided, leads to the moving of the angled side seal bars closer to the side seals of the supporting framework. Thus, the reception chamber's access door is placed in a seal high level state while the cover is in a closed state and the transport system is in a pressurized state. The movement of the access cover device from an easy user manipulation state to a seal state is facilitated by the clearance in the access cover's radial bearing relationship with its support structure. Moreover the seal means of the present invention makes for a very effective air brake without the need for hard interference type seals. In addition, the above described sealing system requires no detent to hold the door closed as the seal arrangement avoids any tangential torque on the cover during the sealing off of the reception carrier due to pressure generation therein phase.

The present invention access chamber assembly with sealing arrangement is also well suited for point-to-point systems such as one used in a warehouse or multi-story building for the transport of items as in documents and manufactured goods and wherein there is a vertical drop relative to a floor or floors of interest (e.g., a first stop point provided in a top floor or intermediate floor or roof of a multistory building that has a vertical access tube extending down to feed that chamber as well as a second point such as one having even a longer drop transport tube extending down to feed the opposite stop point access chamber of the point-to-point system as in a basement situated access chamber assembly). Also, with long drops at each end of the point-to-point travel there can be provided a braking valve device like that described in the above noted co-pending application.

DETAILED DESCRIPTION OF PREFERRED EMBODIMENTS

Figure 1:
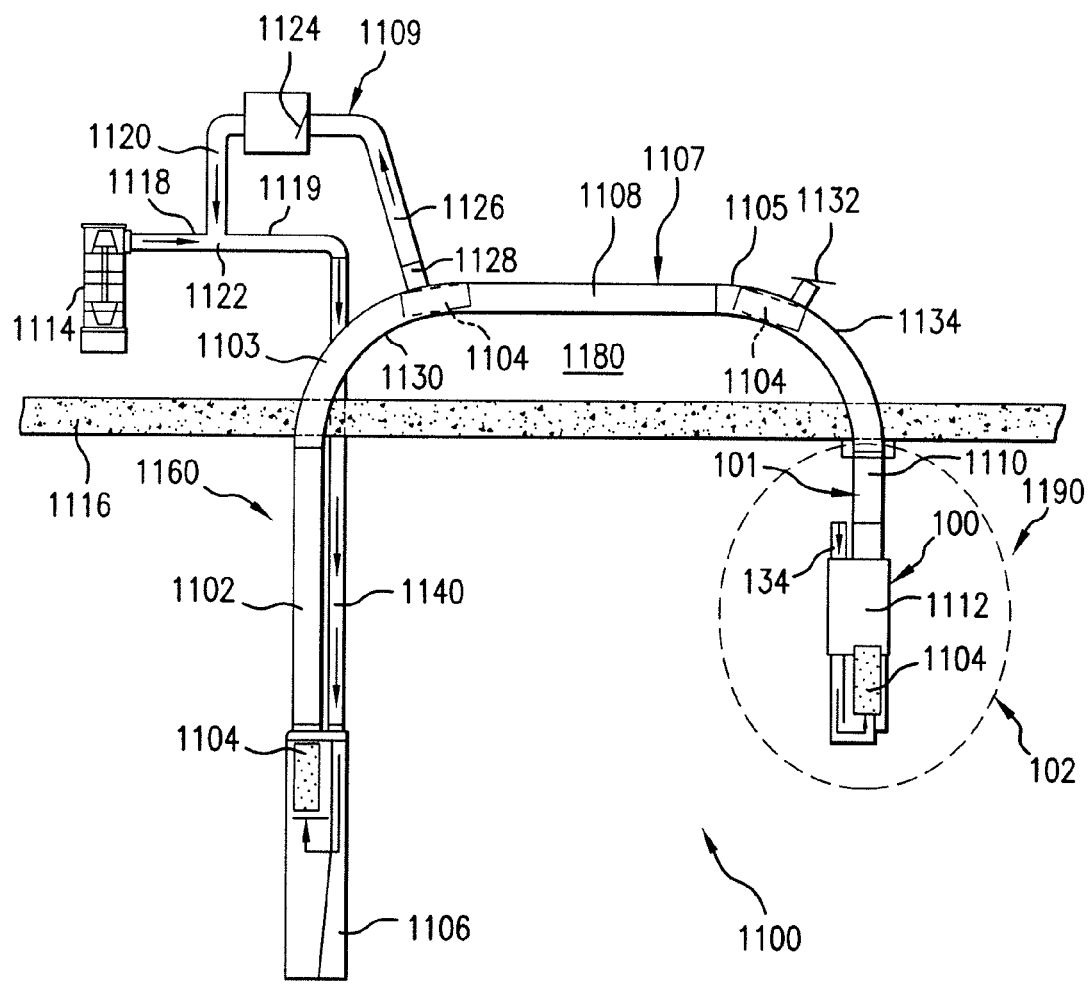
FIG. 1 shows an example of a pneumatic carrier transport system with an embodiment of the access chamber assembly of the present invention.

FIG. 1 provides a schematic diagram of a pneumatic transportation system 1100 suited for use with access chamber assembly 100 of the present invention. This illustrated carrier transportation system is shown as one intended for use by a drive up customer at a financial institution. System 1100 includes various components on a customer side 1160, in an attic 1180, above a ceiling 1116 and on a teller side 1190. Attic 1180 is preferably an enclosed, hidden compartment often provided within a car port extending from the main body of a bank and which car port covers over one or more drive through lanes and one or more customer stations (only one customer station and teller station shown in FIG. 1 as a basic example).

A vertical tube section 1102 provides transport carrier access to the customer. The customer places documents into a transport carrier 1104 and places that carrier (typically a cylindrical canister with rotating end cap with opposite end annular flange seals) inside a customer station 1106 to which the first vertical tube section 1102 connects.

In operation, transport carrier or canister 1104 is moved pneumatically upward through vertical tube section 1102, along a customer side curved tube section 1103 through a transverse tube section 1108 (illustrated in FIG. 1, but normally hidden from view in use as it extends above ceiling 1116), to a second, teller side curved tube section 1105 and then to vertical tube section 1110, coming to rest at a teller station 1112. As shown in FIG. 1, on the teller station side 1112 there is featured transport system sub-section 102 (represented by the dashed line demarcation in FIG. 1) which includes access chamber assembly 100 of the present invention (and thus in combination with the other system components shown provide an embodiment of a transport system in accordance with the present invention). Access chamber assembly 100 provides a carrier canister reception chamber with a suitable permanent or releasable canister stop for enabling access of the canister.

Carrier 1104 is propelled by air flow caused by a pressure drop across the container. Pressure on both sides of the container is controlled with pump(s) and valves. A flow generator as in a turbine box 1114 drives air into or exhausts air from tube section 1118. A tube section 1120 is connected to form a T-junction 1122 relative to tube sections 1118 and 1119 extending to opposite sides of tube section 1120. Relative to the gas flow tubing 1109, valve 1124 controls air flow between tube section 1120 and tube section 1126, which connects at a T-junction 1128 to the carrier transport tube assembly 1107. That is, pneumatic transport system 1100 includes carrier transport tube assembly 1107 in which both air and the transport carrier traverse and system 1100 further includes gas flow tubing 1109 comprised of tube sections in which air traverses but not the transport carrier.

Transverse tube section 1108 has a first end 1130 that is positioned at the border region between transverse tube section 1108 and customer side curved tube section 1103. Flap valve 1132 is provided near a second end 1134 of transverse tube section 1108 on the teller side curved tube section as shown. As part of the gas flow tubing 1109, tube section 1118 connects, via tube section 1119, to vertical gas flow tube section 1140 that connects at its opposite end with customer station 1106.

In order to land carrier 1104 relatively softly within reception or access chamber assembly 100 at teller station 1112, air is gradually vented around a non-completely sealed carrier (e.g. dissipating seal rings at opposite ends of the carrier) under a controlled dissipation of built up pressure in front of the carrier as it descends down tube section 1110 to its stop point at the teller station.

Turbine box 1114 can be operated to flow air into the system or draw air from the system so that carrier 1104 is moved within the transport system. Thus, carrier 1104 can be propelled either from customer station 1106 to teller station 1112 or from teller station 1112 to customer station 1106 (and back again if so desired). Also, although reception chamber assembly 100 is described relative to teller side 1190, the reception chamber 100 design of the present invention is applicable as well for use on customer side 1160 or on both (or multiple) sides (or sites) in alternate embodiments of the present invention with a few examples provided below.

Figure 1A:
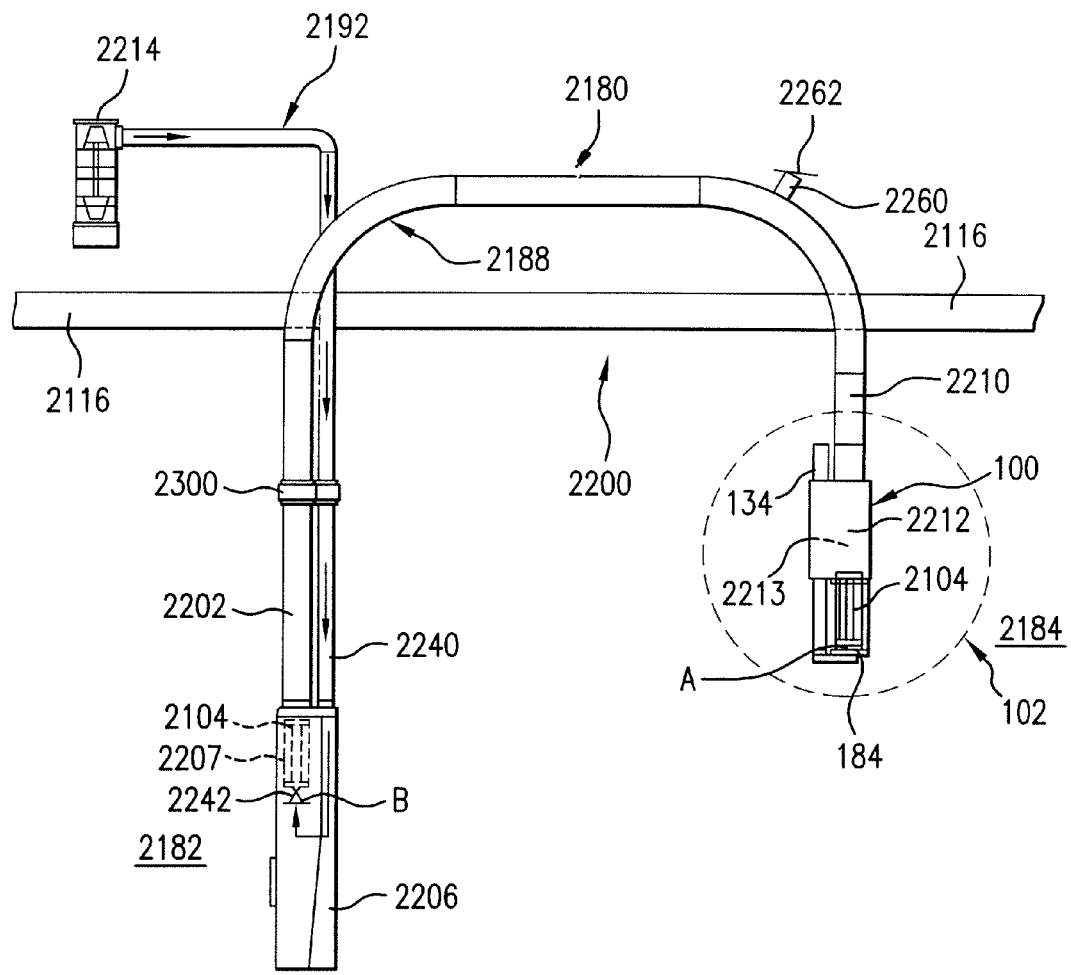
FIG. 1A shows another example of a pneumatic carrier transport system with an embodiment of the access chamber assembly of the present invention.

FIG. 1A provides a schematic diagram of an alternate embodiment of a pneumatic transport system 2180 according to the inventive subject matter which includes access chamber assembly 100 (also shown as positioned on teller side for the illustrated embodiment). As described in the aforementioned co-pending application Ser. No. 11/802,995, entitled "Carrier Transportation System With Brake Valve Device Proximate To A Carrier Receiver" transport system 2180 provides a pneumatic transport system that allows the carrier 2104 to be propelled at a maximum speed relative to the desired maximum speed for the system (which can vary from situation-to-situation) until it reaches only a few feet (e.g., 3 feet or less) from the customer (or teller side) wherein the carrier is braked until coming to a stop or access state (e.g., a soft landing on a rubber ring pad encircling a flap valve).

System 2180 is depicted as a bi-directional pneumatic transport system suited for use in a banking environment that preferably comprises a transport carrier tube assembly 2200 that includes a carrier tube network (wherein a transport carrier travels) 2188 and a flow supply conduit network 2192 or gas flow tubing (for the supply of a fluid to achieve movement in the transport carrier). System 2180 also preferably comprises flow generator 2214 coupled to the flow supply conduit network 2192. Also, the transport carrier 2104 is preferably a canister (preferably with forward and aft dissipating seal rings and an openable end or intermediate region of the canister for accessing and depositing objects as in "documentation" (inclusive of printed material such as deposit slips or currency)). The illustrated carrier or canister 2104 is preferably not in an airtight seal arrangement between the transport tube sections of carrier tube network 2188 and the canister's dissipating seal rings (not shown), but there is a sufficient seal arrangement to achieve rapid transport within the carrier while still providing for the dissipation during its final descent braking to its stopping point or access location in the system.

Bi-directional pneumatic transport system 2180 is shown in FIG. 1A in the form of a bank teller network with a customer side 2182 and teller side 2184; but, it should be apparent that the transportation system elements disclosed herein are applicable to other pneumatic transportation tasks. System 2180 is shown to have a teller side access chamber assembly 100 with teller station housing 2212 (with access chamber assembly 100 providing a carrier reception chamber 2213 providing a point "A" stop for the carrier on the teller side). The second access point (e.g., point B) shown in FIG. 1A is at customer station 2206 (having carrier reception chamber 2207 providing a point "B" stop). Transport carrier 2104 is thus transported within carrier tube network 2188 between points A and B (and preferably back again from B to A in repeated fashion, if desired). Additional teller and/or customer stations are also contemplated in a transportation system under the subject matter of the present invention. In the embodiment of FIG. 1A, the flow generator or flow generating means 2214 is provided for generating a driving pressure differential to accomplish the transporting of the carrier 2104 between the teller and customer stations 2206, 2212 in either direction of travel. Those of ordinary skill should readily appreciate, however, following a review of the present disclosure, that the flow generation means could just as readily be arranged at the teller station or at both locations.

FIG. 1A further shows tube section 2240 connected at one end to flow generator (shown as a turbine) 2214 and at its opposite end opening into carrier reception chamber 2207 (an arrangement similar to access chamber assembly 100 can also be positioned here either in addition to that on the teller side or in place of if some alternate form of accessing is desired at one of access points A and B).

Provided below is an example of a timing sequence for the operation of the pneumatic transport system 2180 shown in FIG. 1A for a customer-to-teller carrier send mode:

T1—operator initiated or sensed initiation of delivery mode (e.g., operator (customer) depresses carrier send button or closes door to trigger delivery mode);

T2—flow generator device (e.g., turbine) turns on to initiate tube network pressurization mode:

T3—Brake valve (preferably a flap check valve like that described in the above noted co-pending application) 2300 is closed due to pressurization air travel in flow supply tube 2240 representing a sole output line from flow generator 2214 and the side input line to the carrier tube network 2188:

T4—Check valve at customer station 2242 opens as pressurized air reaches customer station 2206 (preferably a flap valve supported access a cross-grid plate support and which flap valve opens within the interior of an overlying stopper also supported on the plate support):

T5—Carrier travels past brake valve 2300 while it remains closed:

T6—Carrier travels past valve 2262 and valve 2262 opens wider to more freely vent pressure;

T7—Valve 184 (FIG. 5) in access chamber assembly 100 is closed so as to allow for pressure build up ahead of the to-be-braked carrier.

T8—Flow generator pressure generation discontinued;

T9—Carrier travels to teller carrier reception chamber 2213 with the trapped air ahead of the carrier above works to close valve 184 below to provide a cushion affect on the descending carrier as air is dissipated around the non-completely sealed off transport carrier;

T10—the access chamber assembly access door is opened for carrier access

In going in the opposite direction, a preferred timing sequence for the illustrated system of FIG. 1A for a teller-to-customer carrier send mode is as follows:

T1—operator initiated or sensed initiation of delivery mode (e.g., operator (teller) depresses carrier send button of the access chamber assembly 100 or closes door if an auto-trigger delivery mode is utilized);

T2—flow generator device (e.g., turbine) turns on to initiate tube network depressurization or vacuum mode:

T3—Brake valve 2300 is open due to vacuum draw within flow supply tube 2240 representing a sole output line from flow generator 2214 and the sole source of vacuum generation means connection to carrier tube network 2188 at this time:

T4—Check valve 2242 at customer station 2206 is biased closed under its own weight as a vacuum state exists to both sides thereof:

T5—Flap check valve 2262 closes tighter based on vacuum in line:

T6—Valve 184 (FIG. 5) within teller side carrier reception chamber assembly 100 opens due to vacuum draw:

T8—Carrier 2104 is lifted off from the teller station by atmospheric pressure air passing in through breathing tube 134 and through open valve 184:

T9—Carrier travels through carrier tube network past the valve 2262 which is biased closed with atmospheric pressure to opposite sides under its own weight:

T10—Carrier passes past brake valve 2300 wherein driving atmospheric air therebehind is vented through open brake valve 2300:

T11—Carrier travels down tube section 2202 which contains an essentially sealed off volume of air in front of the transport carrier as valve vacuum draw is essentially precluded due to blocking carrier relative to brake valve 2300 shown above and valve 2242 is in a shut state while the carrier travels to a soft landing on stop in the carrier reception chamber 2207.

T12—The flow generator is shut down 2214 (can be shut earlier with reliance on previously generated carrier travel momentum and/or gravity or later than T13 below if vacuum draw in access chamber is not deemed problematic).

T13—the customer then accesses the access chamber wherein the carrier is positioned.

Figure 1B:
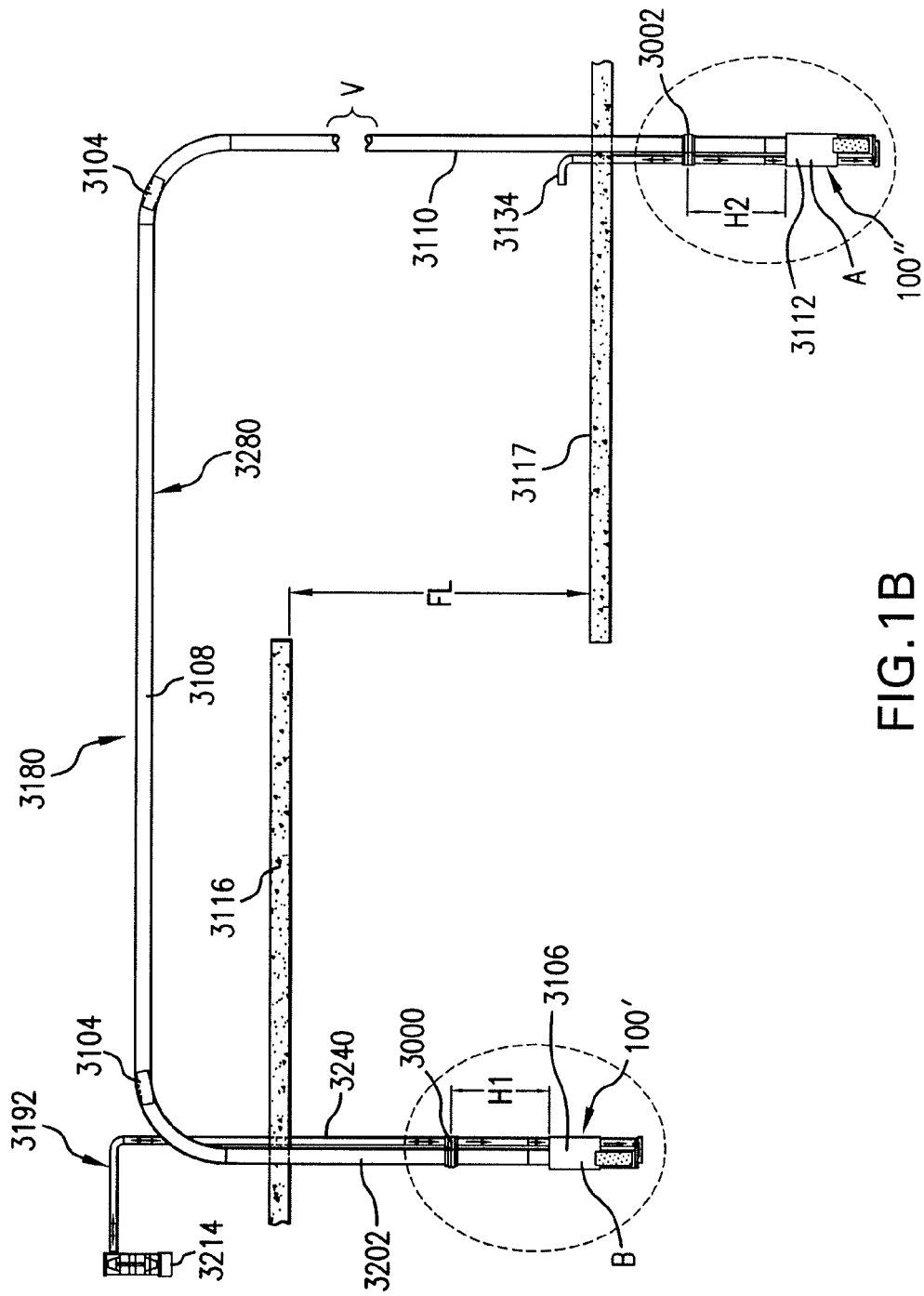
FIG. 1B shows another example of a pneumatic carrier transport system in the form of a point-to-point system shown in use in a multi-story building and with an access chamber assembly at opposite travel point ends.

FIG. 1B shows a point-to-point pneumatic transport assembly or system 3180 which is well suited for use in the multi-story setting shown as having transport carrier tube assembly 3280 and flow supply conduit network 3192. As seen from FIG. 1B there are two brake valves 3000 and 3002 provided above respective access chamber assemblies 100' and 100" which brake valves and access chamber assemblies are similar to those described above. For example, as in the above embodiments the distance $H_1$ and $H_2$ between the brake valves and the access chamber housing is similar to those described above as in less than 3 feet and can be the same or of different values. Also the distance to the carrier stop point from the top of the carrier reception housing is also preferably like those distances described above as in a ½ foot distance such that, as above, the pocket drop is preferably 10 to 20% of the overall distance from the stop point to the horizontal bisect of the brake valve (e.g., an overall distance of 2 to 4 feet, for example).

Access chamber assembly 100" is shown positioned below structure 3117 such as a ceiling of a basement or other floor structure. Thus, for example, access chamber 100" can provide a point within a point-to-point pneumatic transfer system with point "B" shown in FIG. 1B for reference, which can be a basement or lower floor access point for the point-to-point transfer system. As seen from a comparison of FIGS. 1A and 1B, the lower station (e.g., basement station) has a breather tube 3134 which is similar to that in the earlier embodiments but extended up to above the lower structure of the basement or lower floor ceiling (although not shown there is space provided between the floor of a first floor and the ceiling of the floor immediately therebelow and the breather tube outlet can be provided in that region preferably coupled with a general building exhaust conduit leading out of the building interior or can go directly to an external vent location). The extension of breather tube 3134 also provides additional room for the mounting of the brake valve 3002 positioned above the lower access station 3112.

In similar fashion, flow generator 3214 and transverse tube section 3108 (extending horizontally above and traversing between the lower access station 3112 and the higher, common floor as ceiling, station 3106) can be placed within the clearance area provided between the flooring of an above building floor and the ceiling of an adjacent below floor's ceiling. Alternatively, the flow generator and associated carrier transverse tubing and flow supply tubing shown above ceiling 3116 can be placed on the roof of a building. The distance FL is variable as in 10 floors (or more with suitable increase in flow generator output) and thus so too is vertical tubing 3110 (as shown by a variable length cut away section V in FIG. 1B) to match the distance or number of floors involved (e.g., a 10 to 24 foot spacing between floors as in flooring to flooring surface for 1 to 10 (or more) floors in a building or from one building to another building at the same or different height). As further seen from FIG. 1B, since each point in the point-to-point transfer system has a relatively long drop (with the right side shown potentially having a very long drop as in 10 or more floors) there is preferably provided brake valves at the stations associated with each point. In this way, a rapid transfer can be achieved with only a small braking period involved as in less than 3 to 4 feet above the respective, lower access point. Also, at each end is preferably placed an access chamber assembly such as the embodiments described above and below, which work well with the short distance braking and long distance drop embodiments described herein.

Figure 2:
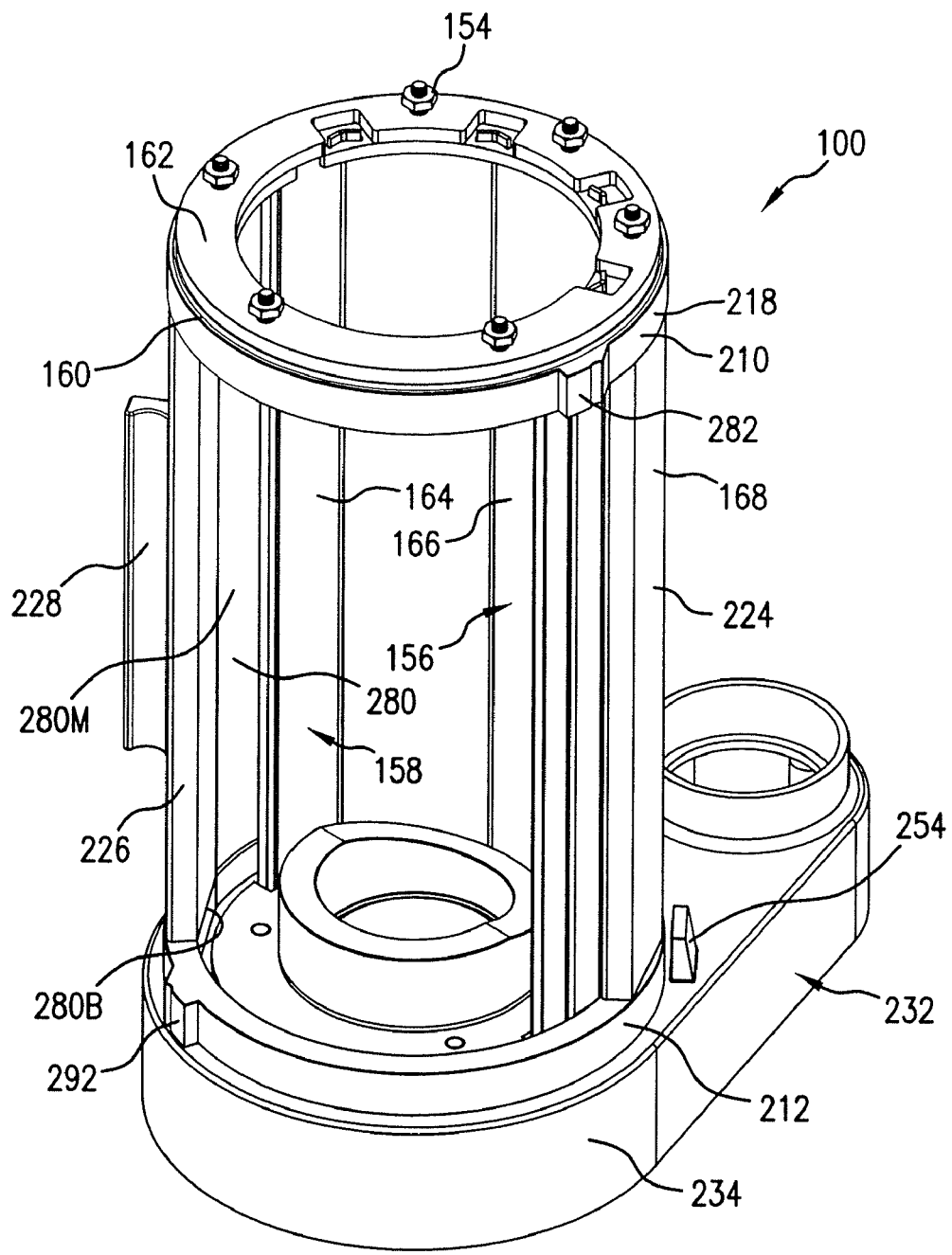
FIG. 2 shows an access chamber or reception chamber assembly for use in a pneumatic transport system like that shown in FIG. 1.
Figure 3:
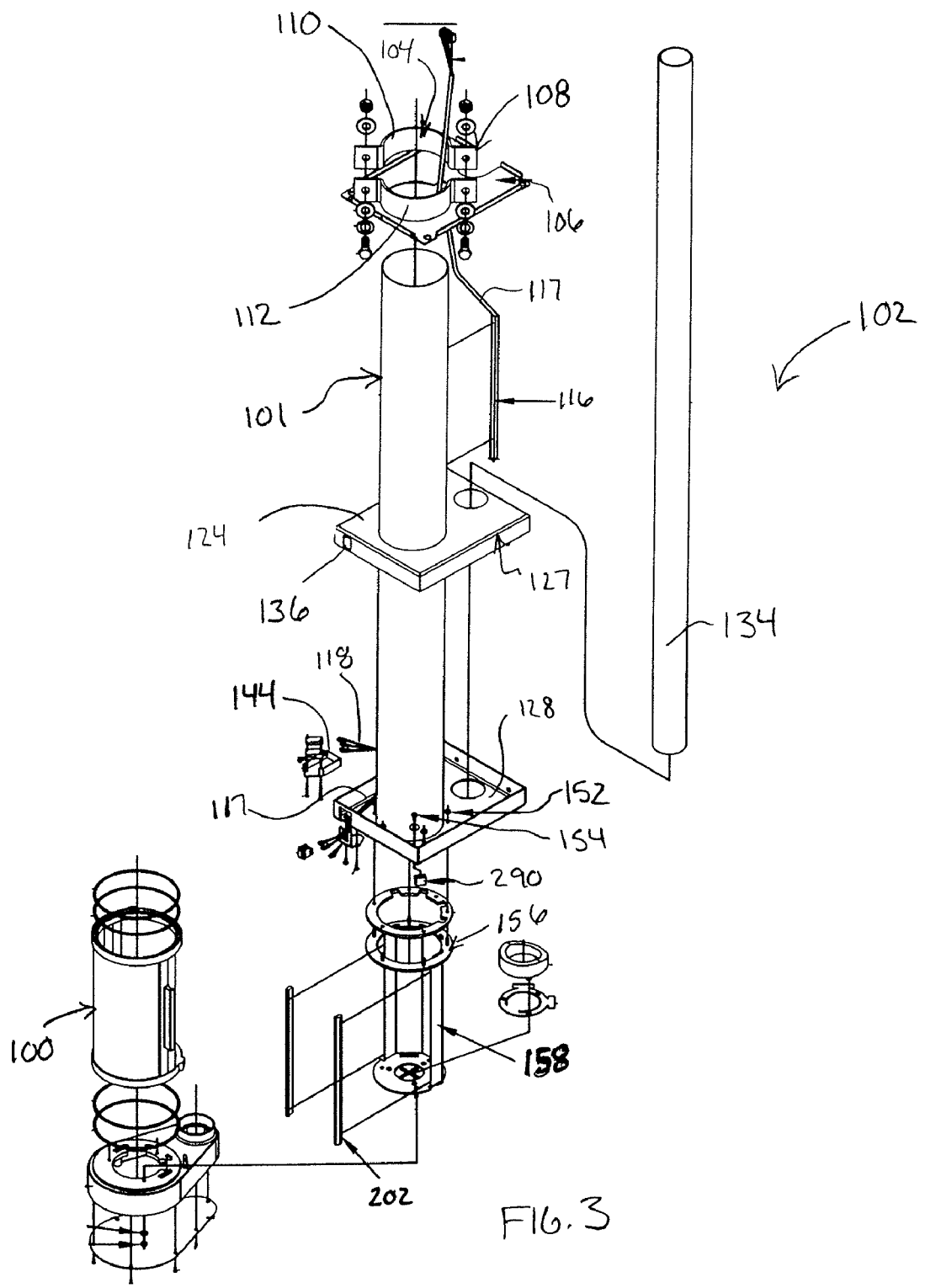
FIG. 3 shows an exploded view of a transport system sub-section of the pneumatic transport system with the access chamber assembly of FIG. 2.
Figure 4:
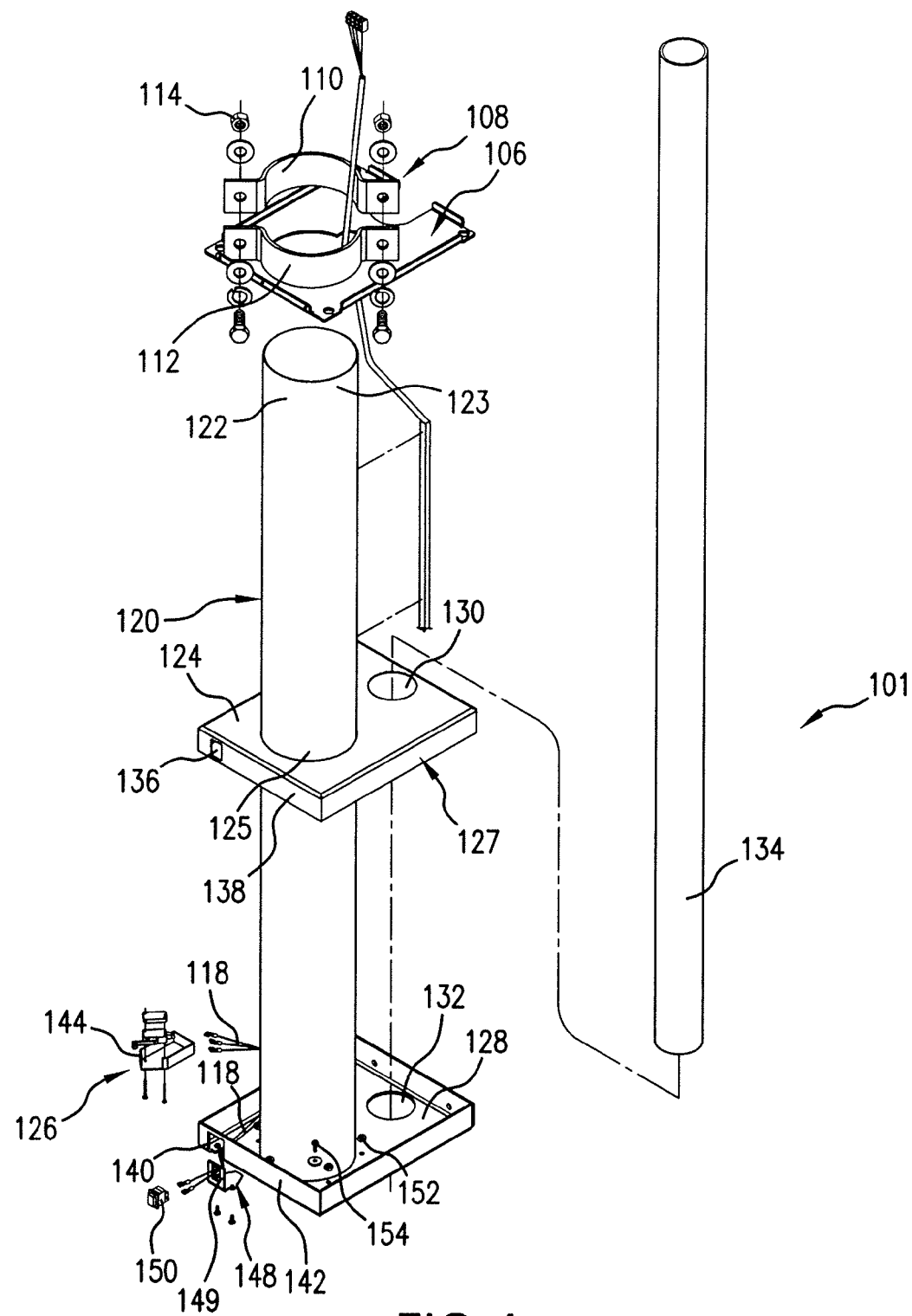
FIG. 4 shows the hanger support structure shown in FIG. 3.
Figure 5:
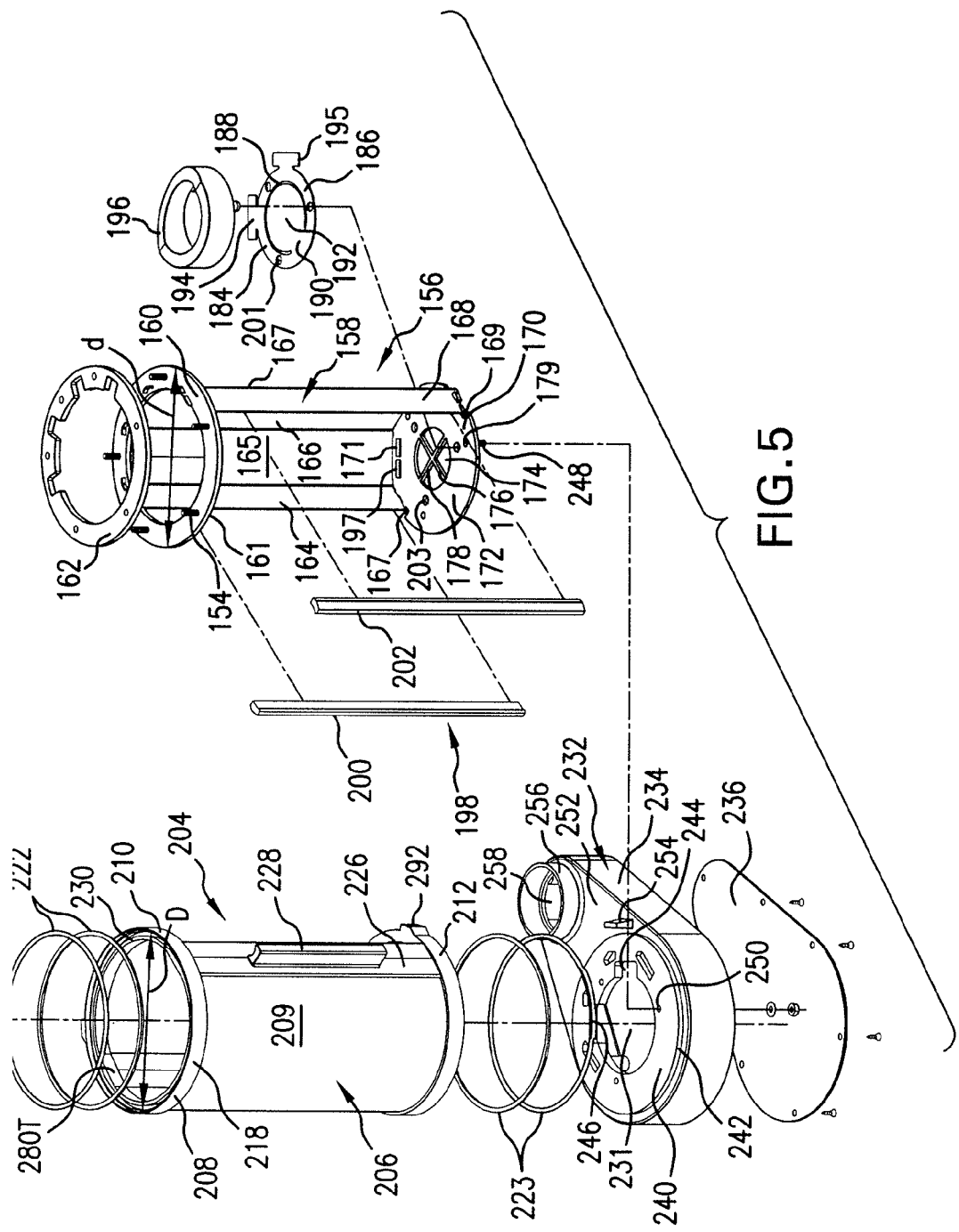
FIG. 5 shows the access chamber assembly of FIGS. 2 and 3 shown in an exploded view.

FIG. 2 shows access chamber assembly 100 in an assembled state while FIG. 5 shows access chamber 100 in an exploded view. FIG. 3 also shows access chamber 100 in an exploded view but as a sub-component of the transport system sub-section 102 fully shown in FIG. 3 and schematically shown in FIG. 1. That is, as represented by the dash line demarcation in FIG. 1, transport system sub-section 102 represents a portion of transport system 1100 shown in FIG. 1. The transport system sub-section 102 is thus comprised of access chamber assembly 100 as well as access chamber support section 101 (FIG. 1) shown in its preferred embodiment in FIG. 4 as a suspension support with transport feed and exhaust tubing. The access chamber assembly 100 of the present invention is also well suited for use in a variety of carrier transport systems where there is provided a reception chamber that receives a carrier or the like, and an access door or alternate access means is featured, and subject to a lower pressure/higher pressure arrangement during different modes of the transport carrier.

FIG. 4 shows access chamber support section 101 of the transport system sub-section 102, and, as seen from FIG. 1, transport system sub-section 102 represents a teller assembly positioned at one end of the overall transport system shown in FIG. 1 with the customer side assembly being positioned at the opposite end. Accordingly, access chamber assembly 100 in FIGS. 2 and 3 represents a teller station sub-assembly (the opposite customer side either featuring a similar access chamber assembly or a different access chamber assembly as in the above-described motor driven, larger customer unit).

With reference to FIGS. 3 and 4, there is seen that access chamber support section 101 comprises hanger support assembly 104 which supports access chamber assembly 100 from above such that it extends down and is at a teller ready access level (e.g., a suitable vehicle window height access in a drive through embodiment). FIG. 4 shows the access chamber support section by itself and free of access chamber assembly 100, while FIG. 3 shows the access chamber support section 101 connected with access chamber assembly or teller sub-assembly 100. As seen from FIGS. 1 and 4, hanger support structure is designed for securement to a fixed structure as in the attic structure 1116 (or a ceiling of a lower floor 3117) and is also designed to have the transport system sub-section 102 in flow and transport communication relative to the remaining portion of the transport system 1100 shown in FIG. 1 (e.g., the transport tube component of sub-section 102 is in flow connection with transport tube section 1105 extending above the attic structure 1116 or the similar components in other embodiments such as those found in FIGS. 1B and 1C). An above or overhead teller assembly arrangement is preferred although other support arrangements such as a bottom base or more intermediate cantilevered support structure arrangement is also featured under the present invention.

As seen from FIGS. 3 and 4, hanger support structure 104 is shown as including tube hanger plate 106 and clamp assembly 108 having clamp halves 110, 112 and associated fastener means such as the bolt/nut combination 114 illustrated.

Tube hanger plate 106 is preferably fixed to a more permanent structure in providing the support section 101 with stability as in an overhead ceiling structure (See FIG. 1 for example). Thus, upon hanger plate 106 being secured to the overhead support structure, clamp assembly 108 is clamped above the upper free end 123 of tube 122 forming part of tube sub-assembly 120 such that clamp assembly 108 rests on the upper structure of hanger plate 106 supporting the remainder of tube sub-assembly 120 which also includes cover 124 preferably fixed (e.g. welding) to the opposite end 125 of tube 122.

Further shown is electric wire harness 116 for supporting the electrical wiring system 117 associated with the teller assembly including wires 118 of the electrical wiring system for the teller station including those shown associated with switch assembly 126 which is used for confirming that the access door is in a closed state before allowing (or before triggering) for activation of flow generator 1114 to initiate carrier transfer from one reception chamber to the other. In this regard, sensor housing cover 144 extends down from the undersurface of housing base 128 to provide a contact sensing arrangement relative to the below described adjustable access cover.

Cover 124 forms a component of support housing 127 which further includes housing base 128. Housing base 128 provides a securement point for access chamber assembly 100. As seen in FIG. 4, cover 124 has reception aperture 130 aligned with reception aperture 132 formed in housing base 128, when support housing 127 is assembled, for receiving breather tube 134. Cover 124 has switch aperture 136 formed in side wall 138 which, upon assembly of support housing 125, is aligned with switch aperture 140 formed in side wall 142. Switch assembly 148 has push button mounting bracket 149 which receives push button 150 which upon being triggered, forwards a blower activation signal via wires 118. Further, push button 150 is externally positioned and aligned to move radially inward within the aligned switch apertures 136 and 140 formed in respective cover 124 and housing base 128. There is further provided switch assembly 126 which is preferably supported on an undersurface of housing base 128 and having a projection or recess in the access door 282 (FIG. 6) which is positioned for contact (e.g., a roller cam leaf spring trigger (not shown)) when the access door reaches a closed position. Preferably, switch 126 is the switch activated by a door closure cam (a roller limit switch) assembly with switch 126 and push button switch 150 wired in parallel so as to initiate teller send mode as an "or" function.

As shown in FIG. 4, housing base 128 has fastener apertures 152 for receiving fasteners 154 that secure carrier pocket sub-assembly 156 to base 128 of access chamber support structure 101. Carrier pocket sub-assembly 156 is shown as comprising carrier pocket 158 which includes upper annular mounting ring 160 with fastener holes for receiving fasteners 154. For facilitating a tight connection and avoiding air leakage at the connection point of carrier pocket 158 with housing base 128, there is provided gasket 162 (e.g., a plastic gasket abutting an aluminum or steel carrier pocket 158) which also has fastener holes through which fasteners 154 extend as by way of threaded studs extending up off ring 160 and up through the corresponding holes in gasket 162 and then further through fastener apertures 152 in housing base 132 of support housing 125.

Carrier pocket 158 is shown with a solid back pocket wall comprised of circumferentially sequenced wall sections 164, 165, 166, 167 and 168 which define a back wall structure that extends down from a radially internal edge of annular mounting ring 160 to peripheral reception edges 169 (FIG. 5) formed about the periphery of base plate 170. Wall sections 164 and 168 are shown diametrically opposed with intermediate wall sections 165, 166 and 167 therebetween. The wall sections do not extend circumferentially for a full 360° (e.g., a 180° circumferential extension is preferred). Pocket 158 thus defines a solid, non-reception side 171 of carrier pocket sub-assembly 156 as well as access opening 172 (the other 180° of the 360° circumference. This arrangement thus leaves side access opening 172 to the opposite side of non-reception side 171 with the side access opening being also the access opening of the access chamber assembly 100 when the access door is opened as explained below.

As shown in FIG. 5, base plate 170 is an annular plate having central opening 174 with cross struts 176, 178 extending within central opening 174. Base plate 170 further includes porting apertures 197 formed in the back region of annular ring portion of the base plate and stud apertures 179. Valve 184 is shown in a preferred embodiment as a flap check valve which provides a transport carrier braking function when closed by allowing for a pressurized air cushion ahead of the transport carrier as it travels down tube 122 (FIG. 4) corresponding with tube section (1110 in FIG. 1, 2110 in FIG. 1A, 3110 in FIG. 1B) and into access chamber assembly 100. Flap valve 184 is preferably of a flexible material, as in an elastomeric material and is shown as having an annular ring portion 186 defined by a non-complete circumferential slit 188 that has the non-slit portion providing a hinge 190 relative to the radially interior nearly circular central flap 192. Central flap 192 is thus supported in horizontal fashion by a cross strut support structure provided by struts 176, 178 when the flap is in a closed state, while the free area between the cross-struts provides for opening 174 which allows for air flow whenever the flap lifts off from its flush with cross-struts position seal state. Valve 184 is further shown as having valve tabs 194 and 195 which are each T-shaped and designed to have each of the outer T portion's free ends extend out over respective slots in the two slot-pairs 197 formed in base plate 170 (only one of two slot-pairs shown in FIG. 5) on the non-reception side 171. Thus, tabs 194 and 195 are sub-flap sections that are held in position at the base of the T-shape by the annular stop or bumper ring and their extended portion function to provide additional flow for makeup air (make-up for the central circular flap section being made relatively small so as to provide proper seating for a landing carrier). These two tabs also function to relieve any impedance of make-up air below/ behind the carrier as it travels through the system. The hinge 190 is shown formed on the opposite side access opening 172 such that the central flap rotates away from the tabs 194, 195.

While an elastomeric flap valve is preferred for providing the valving means 184, alternate valving means are also featured under the present invention as in mechanically activated valving means such as spring biased ball valves or electromechanical valves as in a solenoid driven slide plate valving means with or without sensors, diaphragm type valving means, etc.

Carrier pocket sub-assembly 156 further comprises bumper 196 which is shown as an annular elastomeric block of material having a central air flow opening and that is secured in position to base plate 170 by way of circumferentially spaced plugs (only one shown in FIG. 5) that extend through corresponding holes 201 and 203 formed in flap valve 184 and in base plate, respectively. Thus bumper 196 is designed as not to interfere with the functioning of valve 184 and the movement of central flap 192. Carrier pocket sub-assembly 156 further includes (as part of an overall access door sealing means 198) "neutral" (preferably fixed) seal extensions ("lip seals") 200 and 202. Lip seals 200 and 202 are preferably strips of elastomeric material with recesses designed to receive the free end vertical edges of pocket 158. Alternatively they can be formed as C-shaped cross-sections with the slot formed in the channel bars designed to mount snugly on respective side edges of outer walls 164 and 168 with those side edges being on the side access opening side and thus on the side of the walls furthest removed from non-reception side 171.

As shown in FIGS. 2, 3 and 5, when carrier pocket sub-assembly 156 is combined with access chamber door sub-assembly 204 there is provided access chamber assembly 100 shown in an assembled state in FIG. 2. Access chamber door sub-assembly 204 is shown in FIG. 5 as being comprised of access door device 206 having door frame structure 208, which preferably includes upper and lower annular (full circumference) rims 210, 212. Frame structure 208 further preferably includes an access interior door structure or door facing 209 which preferably takes the form of a transparent or translucent structure as in a transparent or translucent plastic, and the interior door structure 209 is preferably bounded on its upper side, bottom side as by way of an adhesive or overmolding process and also bounded at its opposite vertically extending ends by sealing components 224 and 226 which are shown as door side bar sealing devices. There is also shown in FIG. 5 grasping handle 228 preferably molded as an integral component of the frame structure 208.

Figure 5A:
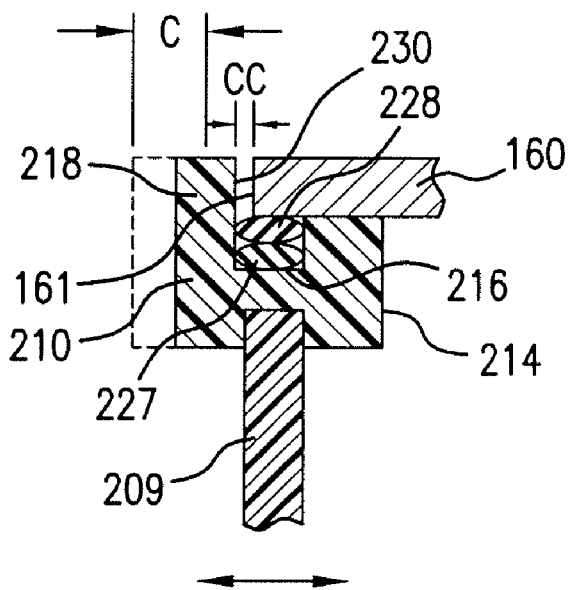
FIG. 5A shows a broken away cross-sectional view of a door frame and its relationship with an annular ring about which it rotates and which ring limits movement of the access door.

As shown in FIG. 5A, upper annular rim 210 includes an interior step wall 214 and a full circumference vertical flange wall 218. The step wall and vertical flange wall combine together to provide a reception region 216. As seen in FIG. 5, there is an upper ring pair set 222 and a lower ring pair set 223. Each pair of ring sets features a higher friction ring having an elastomeric quality 227 as well as a friction reduction slide facilitator or ring 228 as in an o-ring of Teflon material with the elastomeric material serving as a spring to keep the lower friction material in a compressed sealing relationship with an adjoining surface (e.g., contact surface of annular mounting ring 160).

The upper flange wall 218 is also designed to slidingly engage (or clear depending on relative positioning desired) the outer peripheral edge 161 of the upper annular mounting ring 160 (e.g., the vertical wall has an interior surface 230 of larger diameter to extend about the periphery 161 of annular mounting ring 160 with there preferably being arranged the high friction "spring" ring and exterior "slide" ring of the upper set in position within reception region to provide the respective spring and step wall slide functions). Moreover the interior surface 230 of vertical flange wall 218 is of diameter D (FIGS. 5 and 11) which is larger than the exterior diameter d (FIG. 5) of the periphery of annular mounting ring 160 to provide an intentional degree of clearance represented by clearance spacing "C" shown in FIGS. 5A and 5B. That is D−d=2C with C preferably being an intended clearance value in the range of 0.75 mm to 3.0 mm and more preferably about 1 mm to 2 mm (above any tolerance factor involved in the manufacture of the noted components). As explained in greater detail below this clearance factor C provides for a degree of looseness and radial adjustment in the access door device 206 relative to the limiting peripheral edge of ring 160 at desired points of access cover door travel. Also clearance C represents the full clearance range of travel before interior surface 230 makes contact with peripheral edge 161 at a diametrically opposite location. FIG. 5A thus shows upper annular ring 210 at an intermediate stage with their being a current clearance CC between surfaces 230 and 161 with an intermediate clearance state providing adjustment clearance for a full 360° (e.g., a centering with clearance space C). Furthermore, as explained in greater detail below, the clearance spacing and/or tolerance level, can be manipulated to better suit an intended seal relationship. For example, an increase in a seal pitch angled surface can be combined with an increase in the clearance spacing C to better accommodate that increase in pitch.

As shown in FIG. 5, access chamber door sub-assembly 204 comprises chamber base 232 having upper base container 234 and bottom base cover 236. Base container 234 has flow port 231 defined by a raised annular structure 240 having circular peripheral edge 242 with key slot recesses 244 and 246 which provide feed ports for the above positioned slot pairs 197 which are covered by tabs 194 and 195 during non-flow, periods but lift off when the flow pressure is sufficient. From the bottom of base plate 170 extends fastener studs 248. Studs 248 are designed for insertion through holes 250 formed in raised annular structure 240. There is also extending off from container upper surface 252, rotation stop 254 as well as reception flange 256 shown as a cylindrical extension extending about makeup flow port 258 and designed for receiving an end of breather tube 134. That is, breather tube 134 provides for make-up air feed (e.g., atmospheric air feed) for pushing the carrier when system is in teller send-turbine vacuum mode. Thus, when base cover 236 is secured to container 234 there is provided a fluid tight flow casing controlled by valve 184 at one end (with its central flap 192 and two tab extensions 194, 195) and connected to breather tube 134 at the opposite end.

Figure 5B:
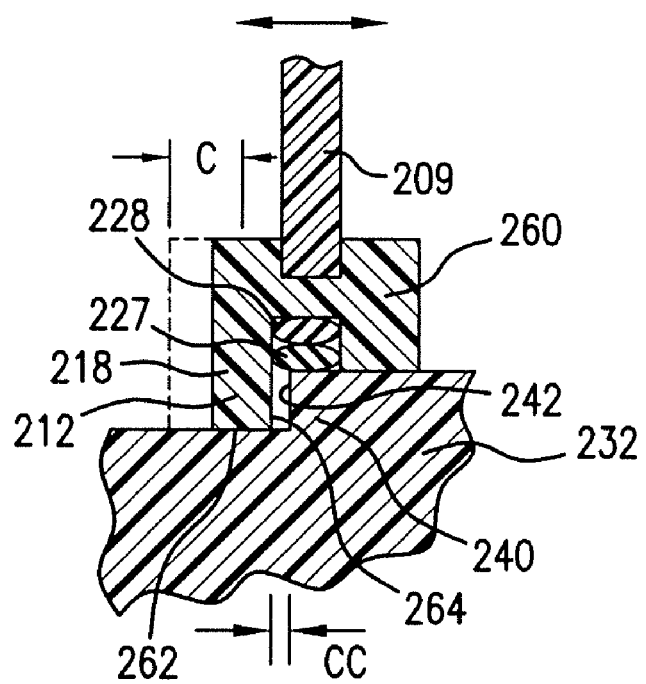
FIG. 5B shows a broken away cross-sectional view of the access door frame and relationship with access chamber base ring.

With reference to FIG. 5B there is seen lower annular rim 212 comprised of interior step wall 260 and exterior vertical flange wall 262 having interior surface 264. Interior surface 264 is of diameter D (like that of upper rim vertical wall 218) and extends with clearance C about peripheral edge 242 of raised annular structure 240 having diameter d (like that of edge 161 of annular ring 160). Thus like its upper annular rim counterpart, annular rim 212 is rotatable about peripheral edge 242 with a current clearance "CC" relative to the full potential clearance C which allows for a predetermined degree of radial adjustment above and beyond any tolerance deviations that may be generated during the manufacture of the noted components in similar fashion as discussed above for the upper rim. The lower end of access cover device and associated seal assembly section is preferably the same as the upper end of the access cover device and associated seal assembly section.

Figure 6:
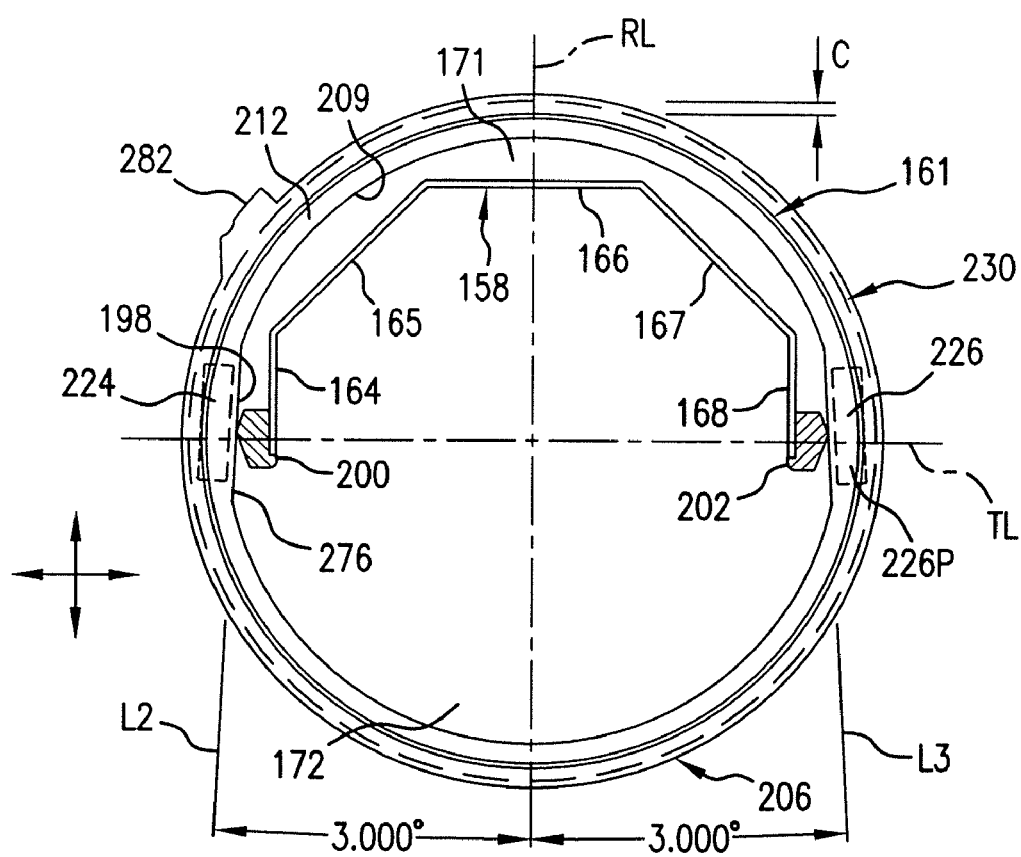
FIG. 6 shows the access chamber assembly with door closed and with the transport system in a static state as when the access chamber is in an unpressurized state (vacuum or low pressure).

FIG. 6 illustrates in schematic fashion a closed access cover at a time when the transport system is in a static state. Thus, access cover device 206 is closed so as to block access to access opening 172 (e.g., a teller places the transport carrier in the access chamber assembly 100 and closes the door to provide for initiation of transport or allow for return from the customer). Carrier pocket 158 has the diametrically opposing wall sections 164 and 168 on whose outer side edges are adhered or otherwise affixed lip seals 200 and 202 (each having recessed interior side slot 266 (FIG. 6A) into which the free edge regions of walls 164 and 168 extend).

Figure 6A:
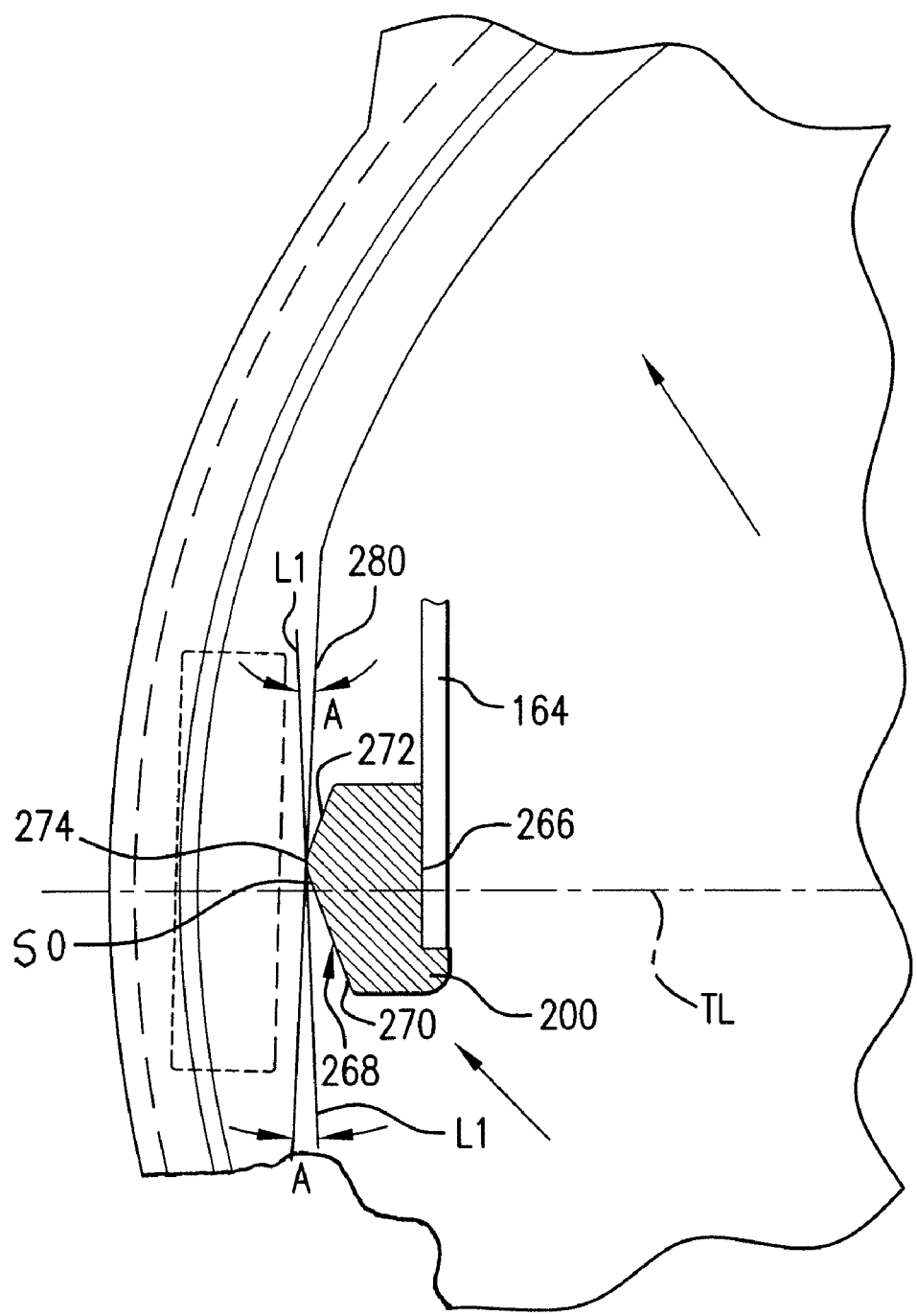
FIG. 6A shows an enlarged view of the left side of that which is shown in FIG. 6 relative to the seal region.

As best shown in FIG. 6A, the outer surface 268 of lip seal 200 (and 202 in view of the symmetrical relationship shown) comprises a sloped forward surface section 270 and a sloped rearward surface section 272 rising in rooflike fashion toward each other to seal peak edge 274. In the arrangement shown in FIG. 6A, peak edge 274 is designed to provide the seal contact relative to the associated seal component (224 or 226) to be placed in contact with it during sealing. Also, peak edge 274 is spaced above the transverse line TL which extends transversely relative to the fixed surface wall section 164 and 168 and just above it in the illustration of FIG. 6A. Also, transverse line TL intersects the interior flat wall surface 280 of seal bar or sealing component 224 at about its mid-point but not in a transverse fashion due to a slight angle A formed in surface 280 relative to line L1 which does extend transversely to line TL. That is, as seen from FIG. 6A, surface 280 has a first portion (upper portion in FIG. 6A) that runs radially inward of line L1 by A degrees and a second section (lower portion in FIG. 6A) that extends radially outward to line L1, with line TL extending through the intersect point between the perpendicular lines TL and the representation of surface 280. This slight taper in the interior seal bar walls 280 (and 281') on sealing component 224 (and 226) is preferably in the range of 2 to 8° with 3 to 6° being preferred with 3° being well suited for the illustrated embodiments.

Thus, in the arrangement shown in FIG. 6A, peak edge 274 creates a point contact edge relative to the tapered plane 280 presented on the associated sealing component or seal bar 224 (and 226 on the opposite side). While this represents a preferred arrangement, the present invention also features other combinations of seal component interfacing to achieve the function of increased seal force upon relative pressured induced adjustment between the two seal component supporting structures (e.g., the access door frame and pocket support) while still allowing, by way of the tapered surface and excess clearance between bearing surfaces of the seal support structures, for ease in relative adjustment between those two seal support surfaces when moving from a closed state toward an open state and including avoidance of tapered seal component interference during that movement.

Other combinations of seal component interfacing includes reversal on each side of the relative seal components as in putting the edge point lip seal on the adjustable access cover frame structure and placing the tapered seal components at the free edges of the pocket structure with the tapers arranged as to provide the wedge or increase seal level due to seal shape function upon the access cover shifting due to a pressure increase in the reception chamber (e.g., a radially out shifting direction upon reception chamber inward pressurization). Additional examples include one side with wedge generating taper on one seal support structure and the other side with wedge generating taper on the opposite seal support structure, or one or both sides having opposing wedge tapers on one or both contacting pairs of seal components. Again the excess clearance spacing is designed to enable relative shifting between the two seal support structures during a time of opening the access cover from a closed state.

In the illustrated preferred embodiment, there is a slight divergence provided in wall surface 280 in running from the non-reception side 171 to the side access opening 172 when the door is in the 0° state. Also, in the embodiment shown, the opposite seal bar 226 has the same divergent relationship such that each of the interior surfaces (280 and 281) of seal bars 224 and 226 diverge in a direction going from the non-reception side toward side access opening 172 along line RL shown in FIG. 6. This divergence in the opposing sides of seal bar surfaces 280 and 281 can also be seen by the divergent nature of lines L2 and L3 in FIG. 6. FIG. 6 also shows the door radial bearing clearance region. The upper and lower door bearing areas are provided with intentional excessive clearance to facilitate door movement in all directions (as per the crossing arrow set to the left of FIG. 6) with respect to the door bearings. For example, there is an intermediate degree of current clearance CC between interior surface 230 and exterior surface 161 (with the same at the lower end ring) such that there is room for radial adjustment at any current point along the bearing track. However, the radially aligned seal component pairs present a limit in relative adjustment of the access door that is dependent upon the spacing, if any, between the paired seal components (seal bar 224 and lip seal 200). Also the door side sealing surfaces 280 are pitched as noted above preferably for their entire vertical length to achieve a full length vertical seal relative to point edge 274.

Also, when the access cover device 206 is in the closed state shown in FIG. 6, projection 282, which extends radially out from upper rim 210, is positioned at about a 10:00 o'clock position and in which position a leaf spring/roller extension of switch assembly 126 (FIG. 4) which is supported in sensor cover housing 144 provides a switch device mounted on the under surface of the housing base 128 and a cam thereof can ride up the sloped surface of rim projection 282 to signal the closed state is present.

A review of FIGS. 6 and 6A also illustrates that when in the closed state shown in these figures (with the transport system in a static or non-pressurized state), access door device 206 is in a slight seal compression state or in a close to seal position state.

Figure 7:
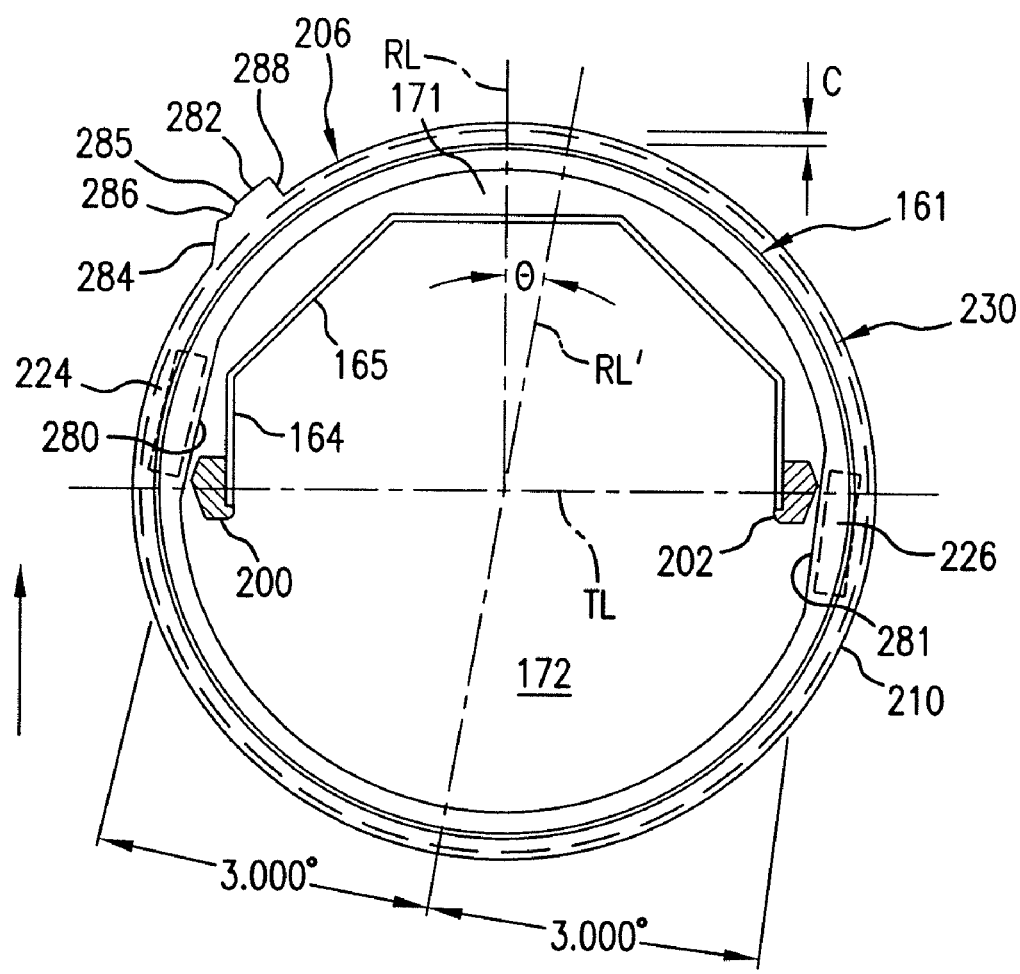
FIG. 7 shows the access chamber assembly with door having been moved from its closed state to an open initiation state (10° opening from a 0° closed state).
Figure 7A:
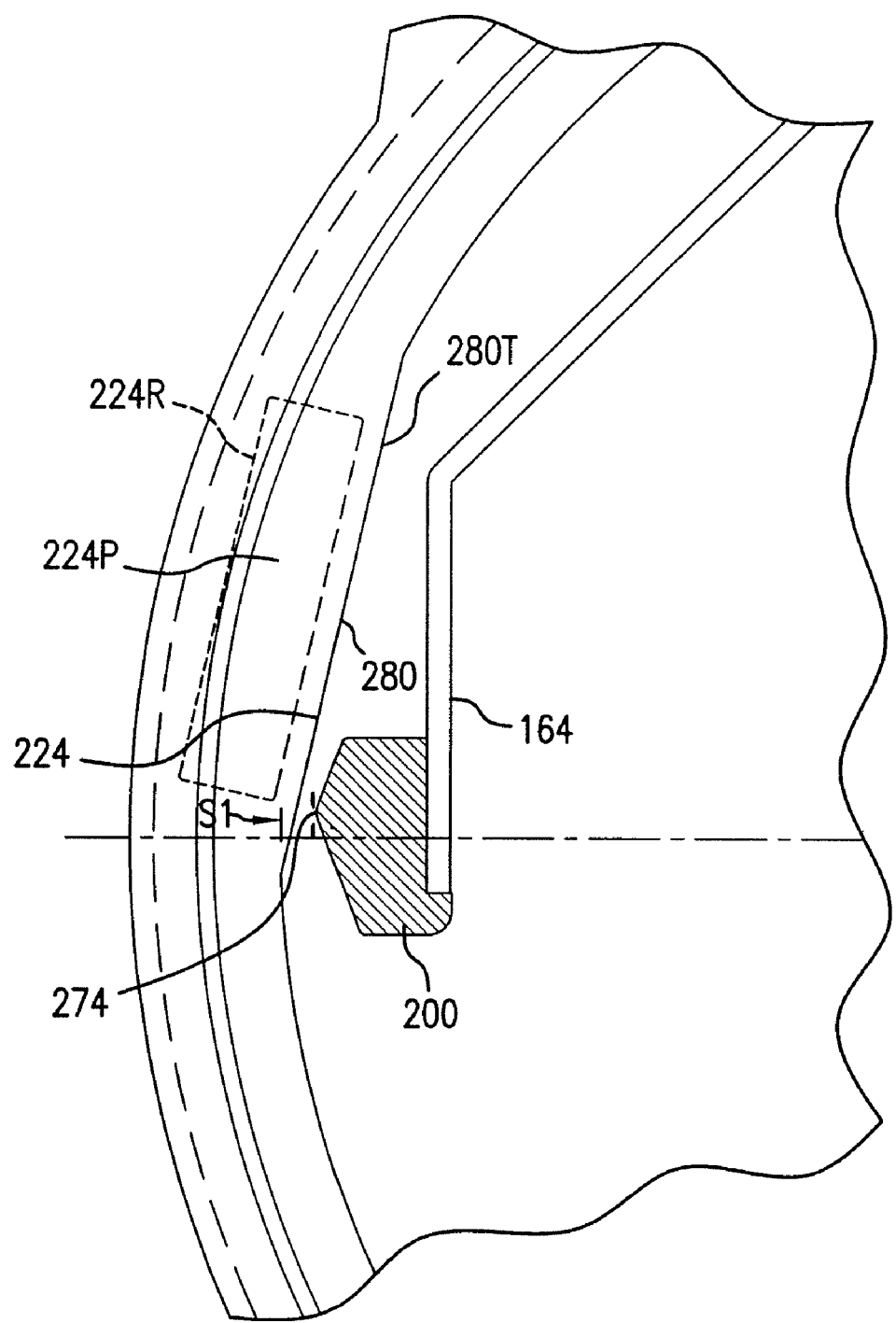
FIG. 7A shows an enlarged view of the left (or "first") side of that which is shown in FIG. 7 relative to the seal region.
Figure 7B:
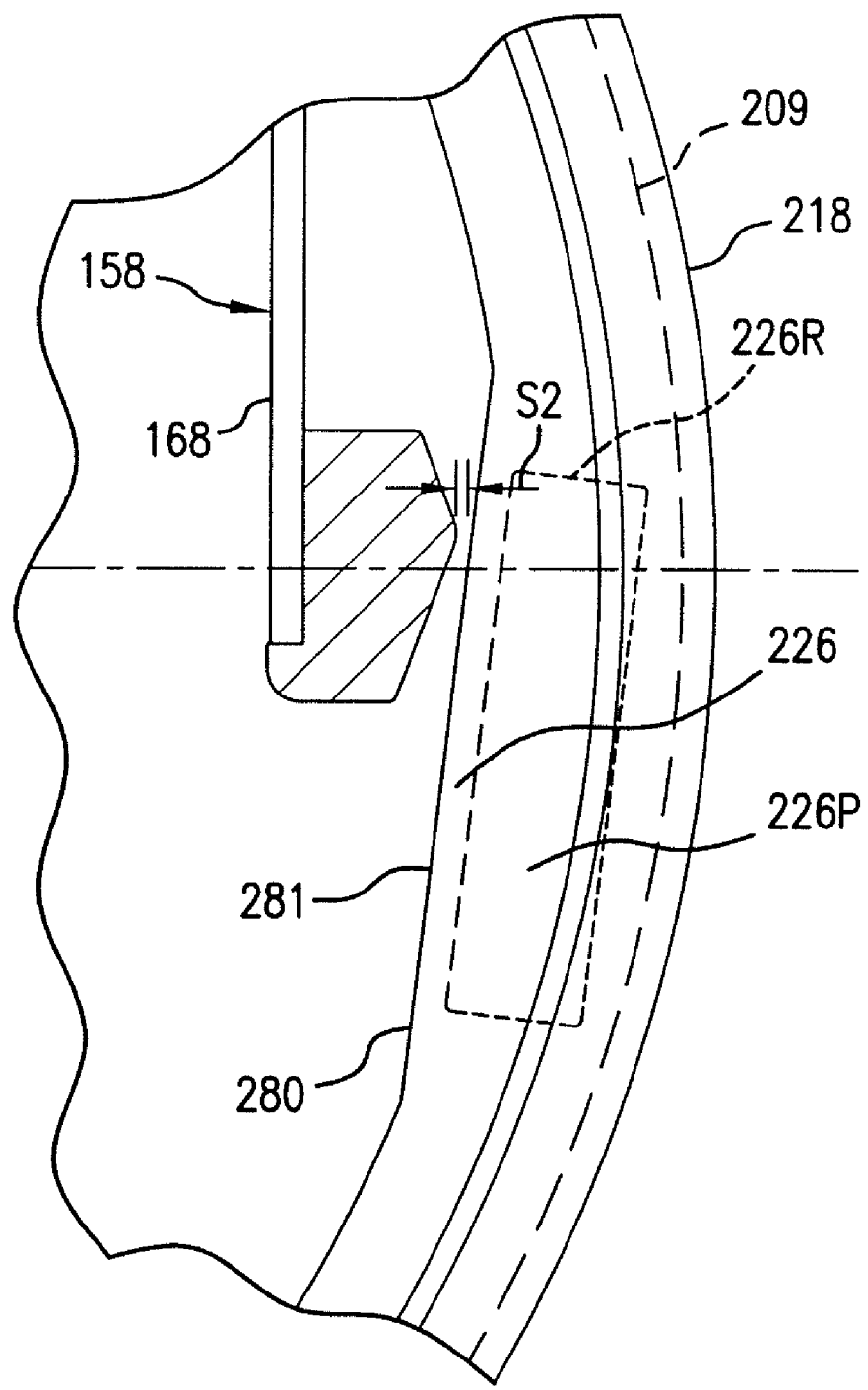
FIG. 7B shows an enlarged view of the right (or "second") side of that which is shown in FIG. 7 relative to the seal region.

As seen from FIGS. 7, 7A and 7B, as access door device 206 is rotated clockwise. Reference line RL rotates in the clockwise direction for an angle θ of FIG. 6 to assume new reference line position RL'. This results in movement of the trailing edge (represented by door side bar sealing device 226) of the door frame 208 of door device 206 from its closed, no-access state toward a partially open or close to initiation of open access state. The upper and lower rims 210 and 212 extend about the full circumference of the access door device and thus are shown in solid lines in the top schematic view of FIG. 6. The preferably clear transparent door facing 209 occupies only about 40% to 70% and preferably 50% of the circumference of the rims 210 and 212. Thus, when access door device 206 is rotated away from the fully closed state at some other point of rotation, one of the free vertical edges of the door frame (represented by the door seal bar 226 extending between the upper and lower rims 210 and 212) becomes circumferentially spaced away from the solid pocket wall 158 on the access side 172 which leads to an initiation of an access opening.

As seen from the right side of FIG. 7 and by the corresponding enlarged view of FIG. 7B, the door side bar sealing device 226 is still preferably associated with the fixed in position lip seal 202 supported by carrier pocket 158 at the illustrated 10° rotation location shown in FIGS. 7 and 7B. As also seen from these figures, sealing component or seal bar 226 is just about free of the fixed lip seals 202. In a preferred embodiment the fixed lip seal bars 200 and 202 are formed of a flexible, elastomeric material that is preferably a relatively hard rubber material such as a rubber material having a 30 to 40 durometer value range. A suitable material is "NEOPRENE" material which material is molded to the desired shape. This rubber material can also be relied upon for forming the stop bumper 196 (e.g., a 40 durometer molded Neoprene material ring). The more flexible flap of flap valve 184 is preferably formed of silicone rubber as a thin sheet of durometer 30 to 50. The corresponding "lip seal"-"seal bar" seal component pairs, such as lip seal 202 and seal bar 226 on the right side of FIG. 7 and lip seal 200 and seal bar 224 on the left side, are preferably formed of different materials with the lip seals preferably formed of the above-noted elastomeric material and the seal bars preferably being formed of a plastic material as in a molded polycarbonate which is preferably the same plastic used in the door frame structure 208 in its entirety.

Figure 11:
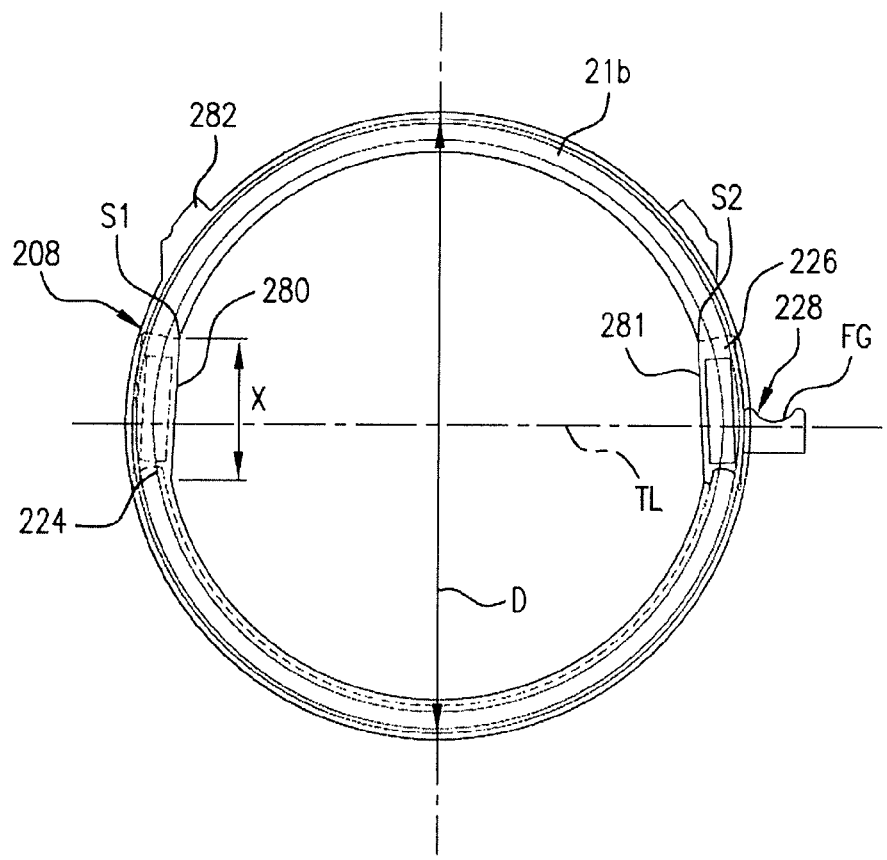
FIG. 11 shows a left end view of that which is shown in FIG. 10.
Figure 13:
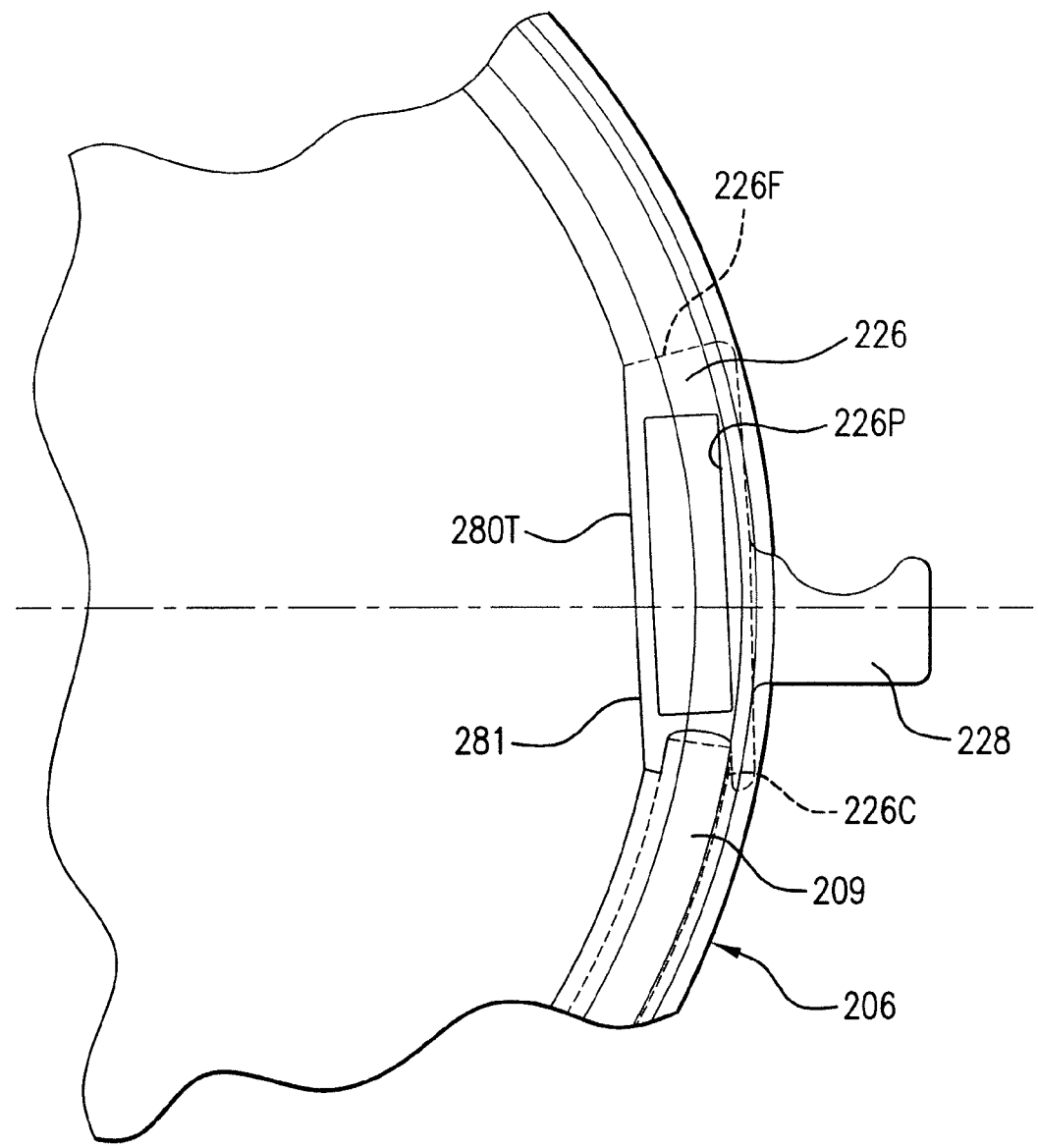
FIG. 13 shows a right end enlarged view of that which is shown in FIG. 11.

For example, the upper and lower rims 210 and 212 best shown in FIGS. 5A and 5B are preferably each formed as an individual molded plastic ring (e.g. universal approach with each of rims 210 and 212 having the same exact design) for adhesion joining with the upper and free edges of the preferably transparent, semi-cylindrical door facing 209. The seal bars 224 and 226 thus preferably have C-shaped plastic channels at their interior ends with each respectively having the above described tapered interior surfaces 280, 281. Within the groove of the C-shaped seal bar edges extends the respective vertically extending side edges of the door facing 209 as by way of an adhesion bond or an overmolding technique or the like. As shown in FIGS. 2, 11 and 13, the seal bar 226 (right side in FIG. 6) preferably is integrally formed with grasping handle 228 shown extending radially out from the seal bar 226 on the opposite side of its tapered interior surface. In FIG. 2, access cover device is shown having been grasped and rotated open while in FIG. 5 it is shown as having been grasped and moved to close the access opening. To complete the frame structure 208, the vertical seal bars 224 and 226 are secured to the undersurface of upper rim 210 and secured to the upper surface of lower rim 212 as by a male/female connection arrangement (not shown) with adhesion to retain them fixed together. The male projection (e.g., a mortise and tenon joint arrangement) is preferably formed in each of the opposite ends of the seal bars and inserted into reception cavities formed in the rims 210 and 212. An example of this arrangement is seen, for instance, with reference to dashed rectangular box 224P and 226P in FIGS. 7, 7A and 7B representing the seal bar projections and recesses 224R and 226R formed in the top rim 210. The male/female relationship can also be reversed for any one of the noted projection/ recess combinations described above. Also, the interior tapered surface 280, 281 of the seal bars is preferably made to be in a flush planar relationship with flattened, diametrically opposing surfaces of the interior surfaces of annular rims 210 and 212 as represented by flattened surface 280T (FIG. 13) in the upper rim 210 (each side shown the same for tapered surfaces 280 and 281) and flattened surface 280B formed in lower rim 212 (each side same) which again are preferably made flush with the respective interior intermediate wall surfaces 280m (FIG. 2) for the seal bars 224 (and 226).

Upper rim 210 is also preferably formed with projection 282 which doubles as both a switch cam means and part of a stop means. As seen, for example, in FIGS. 2 and 7 projection 282 extends radially out from the exterior of vertical flange wall 218 and has a sloping surface 284, an outer flat surface 285 with a sensor roller catch recess 286 as well as a steep return opposite wall 288 providing a stop contact surface relative to door stop projection or door hard bumper 290 (FIG. 3) extending down from the undersurface of housing base 128. The other door bumper 254 which is mounted on base surface 252 is designed to contact radial projection 292 of lower rim 212 when the access cover door is rotated to the closed access cover state. Bumper 254 is designed to preclude over-rotation when the access cover door is placed in the FIG. 6 illustrated 0 degree, closed and static state mode for the access cover door 206 by abutting the steep wall section of projection 292 (preferably as each of the upper and lower rims have the same "universal" design, the projection 292 shares a common configuration as that of projection 282 on the upper rim 210 as shown in FIG. 7 although the cam and sensor catch surfaces are not utilized). When the projection 292 and bumper 254 are contacting, there is preferably arranged a "closed door" sensing as by having a roller based leaf spring extending out of switch housing 144 representing a sensor assembly run up along the upper projection's cam surface 284 and then settling in recess 285 when the lower bumper 254 and lower projection 292 come in stop rotation contact. As explained below, when the access door is rotated the other way to the full open or full access state, the top rim projection 282 comes around into abutment at steep edge 288 with the door stop 290 which is arranged generally diametrically opposed to the switch housing 144 also extending down from the undersurface of the cover base.

As seen from FIG. 6A, projection point 274 of lip seal 200 is contacting or essentially contacting (e.g., less than a 1 mm spacing therebetween) seal bar 224. For reference purposes this non-existent or small level spacing is referenced S0 for the illustrated 0°, closed and static state mode for the access cover door 206. In view of the symmetrical arrangement presented by FIG. 6, the opposite side seal arrangement of the overall seal means 198 shares a common arrangement.

With reference to FIGS. 7A and 7B there is seen spacing S1 between edge point 274 of lip seal 200 and the closest surface point of interior surface 280 of seal bar 224 and spacing S2 between edge point 274 of lip seal 202 and the closest surface point of interior surface 281 of seal bar 226. As seen from these figures, the spacing relationship is S0<S1; S0<S2 and S2<S1. In view of the presence of spacing S1 and S2, access door device 206 can freely rotate which free rotation capability is further enhanced by the bearing clearance feature represented by the solid door radial bearing clearance "C" or more precisely the adjustable with shifting current clearance CC relative to the diametrically opposed regions associated with spacings S1 and S2.

Upon further rotation the trailing edge represented by the moving door side bar sealing device will rotate further free of lip seal bar 202 and initiate formation of the access opening. As seen in FIGS. 7, 7A and 7B, this movement is facilitated by the sealing means and bearing surface combination of the present invention. That is, as the access door device 206 is rotated (clockwise from top in the illustrated embodiment) the angled surface 280 (comprised of top, middle and bottom flush surfaces 280T, 280M and 280B for each of seal bars 280, 281) of the left seal bar 224 moves away from the left lip seal 200 as to allow the entire door closure device 206 to shift to the right due to the bearing clearance feature with this adjustment to the right allowing the right side door seal bar 226 to clear (or further clear) right lip seal 202. In other words, upon left side lip seal clearance spacing S1 being made available, there is allowed a reduction in spacing S1 as by the right shift provided by bearing clearance spacing C in general and "CC" in particular, which reduction of S1 leads to an increase in the right hand spacing S2 of the seal bar 226 from the right side lip seal 202 and thus an easy dissociation from the right lip seal 202 as well as freedom from binding rotation contact between the access closure device 206 and the bearing surfaces of the upper ring 160 of carrier pocket 158 and the periphery 240. Also, in, for example, FIG. 6, there is referenced the clearance by way of a thickened circular line as depicting in exaggerated fashion the bearing edge such as peripheral edge 161 relative to the interior bearing contact surface 230 represented by dash lines. The bottom ring 212 with its interior contact surface 264 would present a similar view.

This ease of rotation continues as the access door device 206 is further rotated to gain access to the access chamber until a full open state is reached which is preferably at less than 180° relative to the 0° closed state reference start point.

For example, a 165 to 175° and more preferably a 170° rotation until one of the rims 210 or 212 hits a door stop is preferred (in the illustrated embodiment upper rim projection 282 abuts upper door bumper 290).

Figure 8:
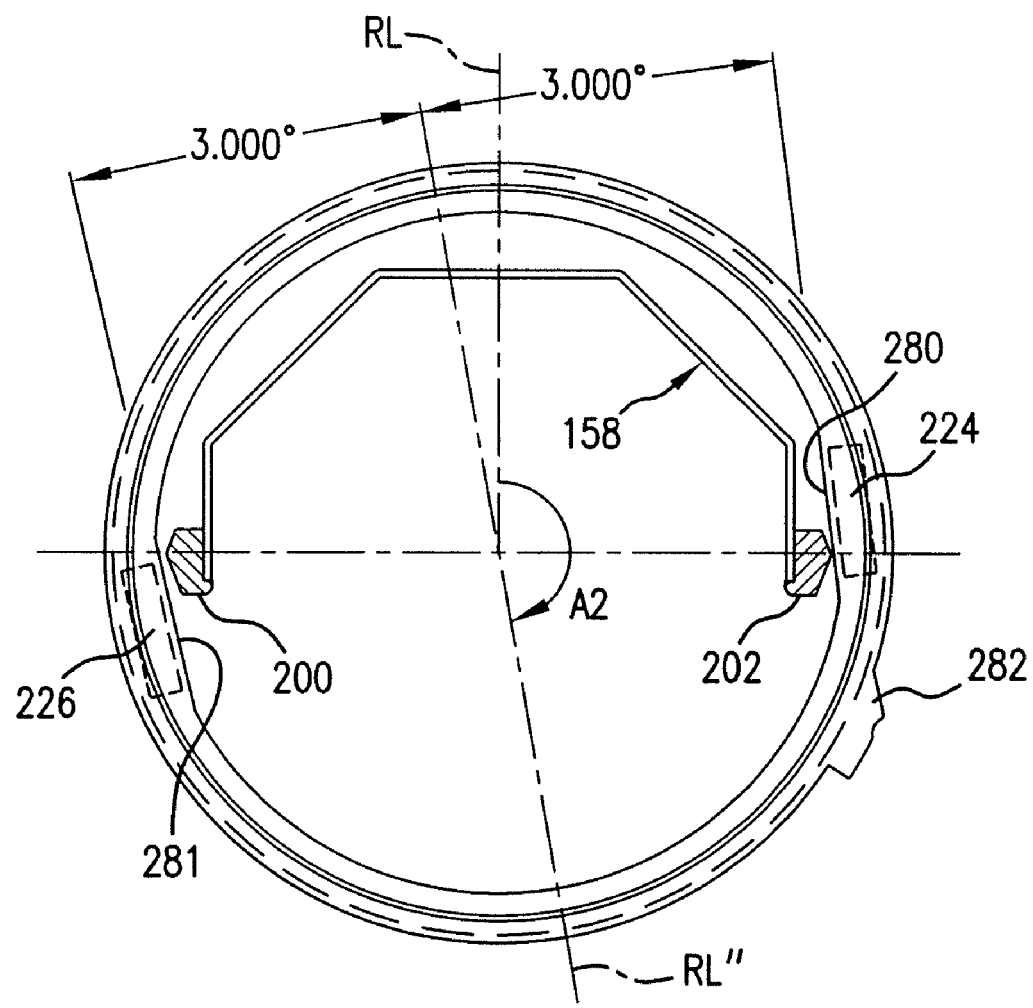
FIG. 8 shows the access chamber assembly with door having been fully open (170° opening from a 0° closed state).
Figure 8A:
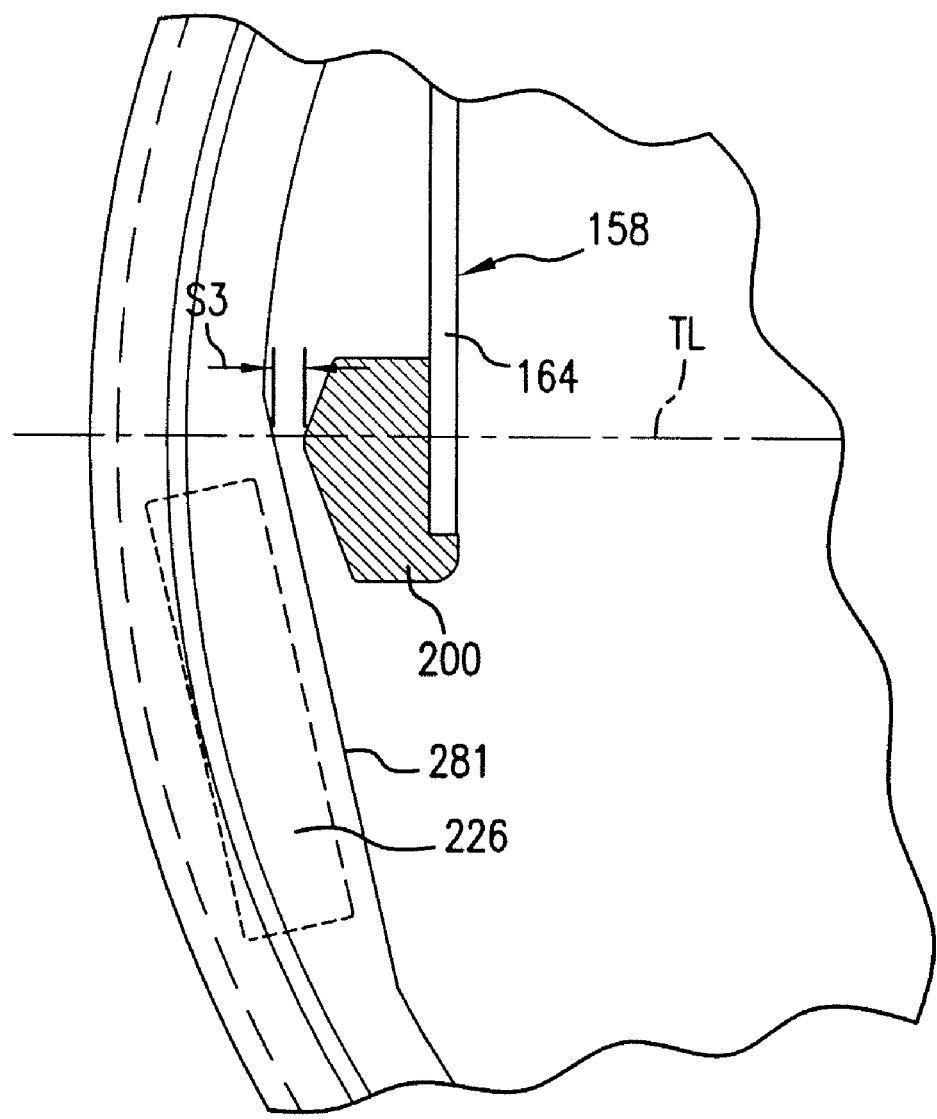
FIG. 8A shows an enlarged view of the left (or "first") side of that which is shown in FIG. 8 relative to the seal region.
Figure 8B:
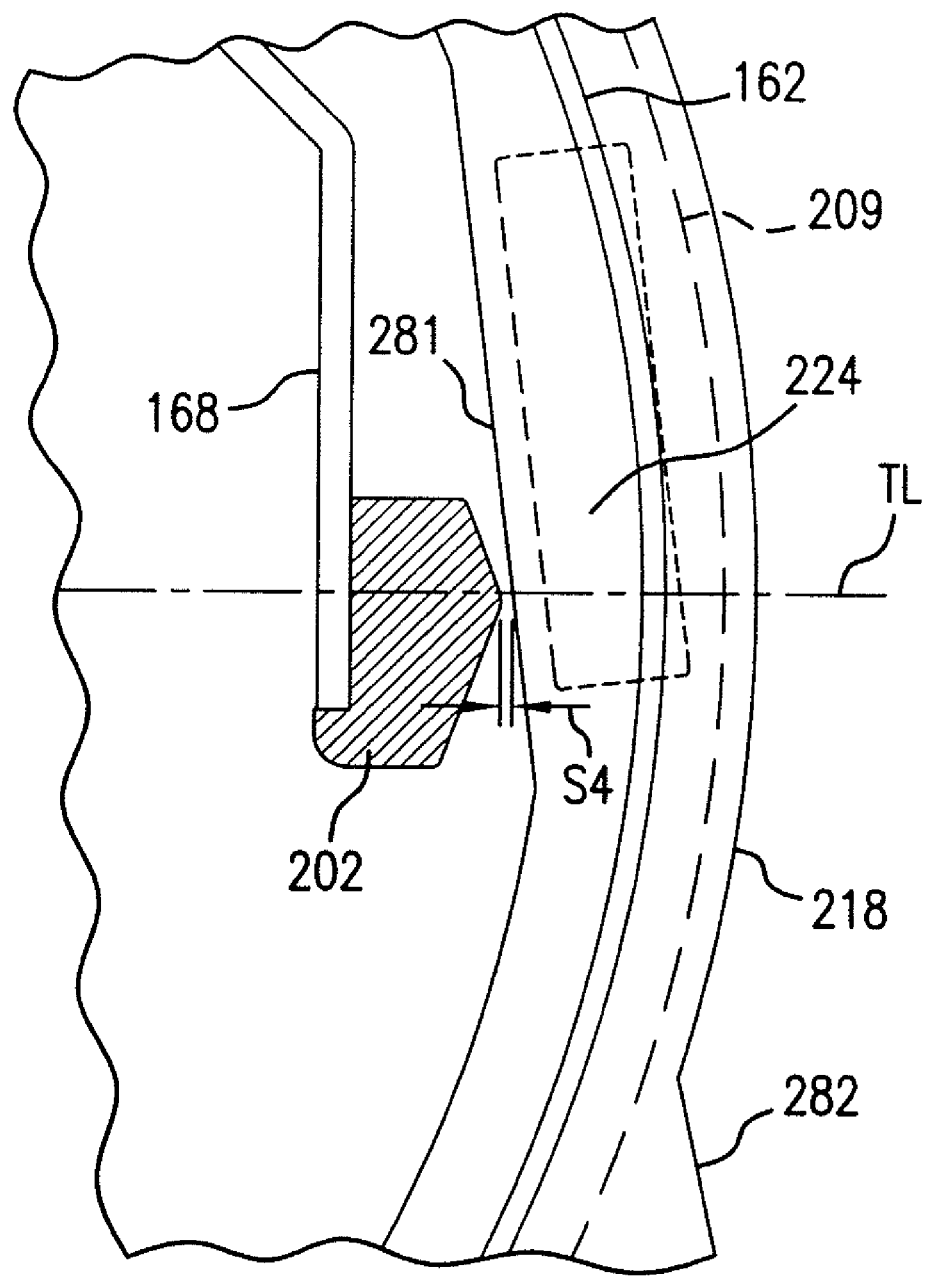
FIG. 8B shows an enlarged view of the right (or "second") side of that which is shown in FIG. 8 relative to the seal region.

In regard to the rotation to a full open state, reference is made to FIGS. 8, 8A and 8B. These figures show the original 0° reference line RL and the full open reference line RL" following a rotation of angle A2. As seen in these figures, access door device 206 is preferably stopped at 170° which keeps the angled door bars 224 and 226 and adjacent most lip seals 202 and 200 circumferential separated (note the pairing of which lip seal is closest to which bar seal is reversed from the 0° closed state due to the movement of the seal bars through the 170° rotation range). In other words, with reference to the preferred seal arrangements presented, the tapered surface 281 of seal bar 226 moves from a top-to-bottom divergence (or outward taper) when in the 0° position on the right side to a bottom-to-top divergence when rotated over to the left side. Also, since seal bar 226 is stopped before full rotation, there is an enlarged clearance spacing between point edge 274 of lip seal 200 and the adjacent most point on surface 280 of seal bar 226 as represented by S3 in FIG. 8A. Also, while the taper of seal bar 224 on the right hand side works to lower the spacing, the less than full 180° rotation places it on the lower side of transverse line TL or in a region early in the inward taper extension as represented by spacing S4 in FIG. 8B. In addition, the bearing clearance provides for a greater degree of spacing flexibility in this regard.

When it is desired that the transport system be utilized for transferring the carrier to the access chamber, the operator closes the door, and this closed status is sensed by sensor assembly 144 (both customer and teller stations are sensed in a preferred embodiment for a transport system). The flow generation device is then turned on to initiate carrier transport within the transport system. As noted above, access chamber assembly 100 is well suited for use when the pressure increases in the access chamber during the braking of the carrier as the carrier travels within the tube network past a release valve (e.g., release valves 1132 and 2262 in the FIGS. 1A and 1B transport system examples) that is open and while a lower valve 184 (FIG. 5) is closed. This carrier position and valve status relationship seals off the region ahead of the carrier such that pressure builds up as the carrier travels within the tube network to a soft landing on bumper 196.

Figure 9:
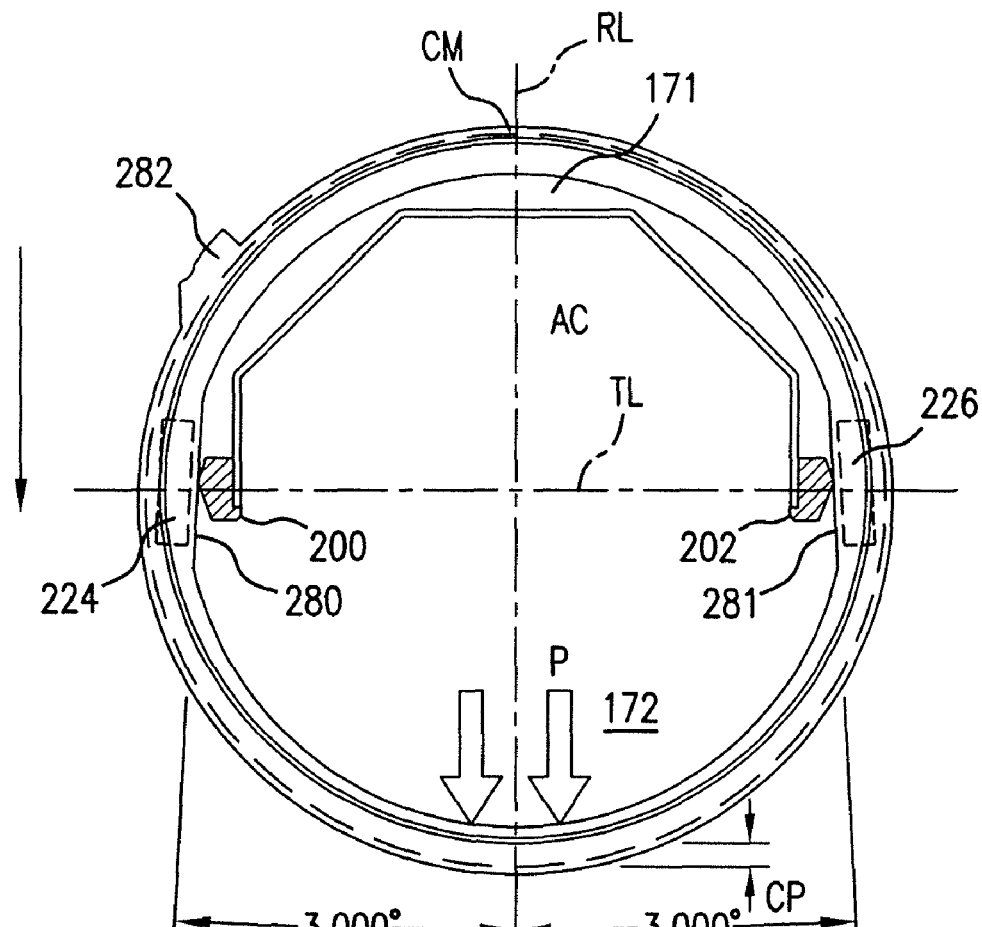
FIG. 9 shows the access chamber assembly with door closed and with the transport system in a mode wherein the access chamber is in a pressurized state as during a braking period for a transport carrier.
Figure 9A:
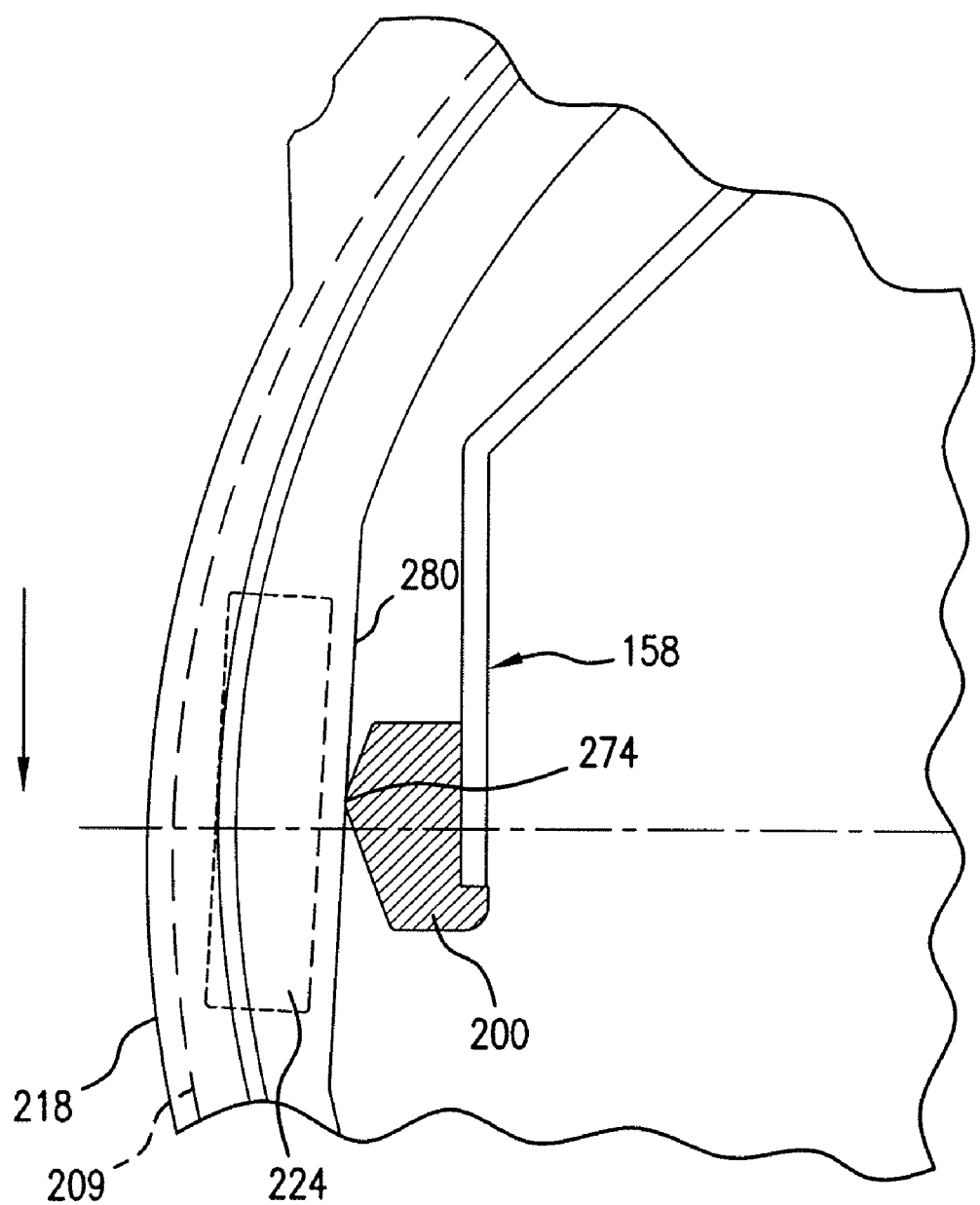
FIG. 9A shows an enlarged view of the left side of that which is shown in FIG. 9 relative to the seal region.

FIGS. 9 and 9A illustrate the access chamber assembly 100 when in a closed (0° reference) state (with the lower projection 292 extending out from lower rim 212 abutting the stop 254 extending up from casing 234 (FIG. 5)), and with the transport system pressurized. FIG. 9 shows a top plan view of the access door device closed, while FIG. 9A shows an enlarged view of the left side of FIG. 9 with the right side being in a symmetrical arrangement as described above for FIGS. 6 and 6A (FIG. 6 is also 0° but in a non-pressurized or static transport system state) and thus not shown. As seen from a comparison of FIGS. 6 and 9, the access door device is initially closed prior to pressure activation (as the door close sensor is part of the logic check prior to allowance for a significant (or any) pressure increase in the access chamber of access chamber assembly 100). Thus, the seal arrangement is as shown in FIG. 6 prior to pressurization, but upon pressurization the seal arrangement is as shown in FIGS. 9 and 9A. As seen in FIG. 9 a pressurization of the access chamber leads to a radial force developing on the door facing 209 as the carrier pocket 158 is fixed and closed off on the non-access side 171. This outward radial force on door facing 209 leads to a removal of any bearing clearance remaining and also leads to an increased compression on the opposite lip seals 200 and 202 relative to the tapered surfaces 280, 281 of seal bars 224 and 226 respectively, which taper leads to an increased seal wedge effect as more seal bar material thickness is forced against the fixed in position lip seal edge point 274 relative to the bearing limitation provided by the upper and lower rims 210 and 212 and the associated limiting bearing walls about which they rotate. This shifting can be seen in FIG. 9 wherein behind the pocket 158 along line RL there is 0 or ("CC"=0=CM (minimum clearance)) clearance left as the interior surface 230 of the upper ring has shifted into contact with the peripheral edge 161 (the same shifting occurring for bottom ring 212) while the access covers front face at an intersection point along line RL has a maximum clearance "CP" that exists relative to the bearing surface 161 (or 242 on bottom) with C=CP such that a maximum amount of the wedge shaped seal component is pushed forward relative to the preferably fixed in position seal edge 274.

In other words, when access door device is rotated counter clockwise to the FIG. 9 closed state from the position shown in FIG. 7, the access door device 206 hits against bumper 254 on base 232 and the angled door vertical side bars 224, 226 are then in close proximity to the lip seals 200, 202. The transport system 2180 is activated (reference being made to FIG. 1A although a generally similar access door assembly operation is applicable to the FIG. 1 and FIG. 1B examples of a transport system) such that the carrier 2104 is sent from customer station side 2182 (carrier 2104 shown in dashed lines on the customer side) to the teller station side 2104. The flow of air generated by flow generator 2214 forces carrier 2104 out of customer station 2207 and along tube network 2188. As the carrier moves toward the teller station side 2184, air ahead of the carrier is exhausted out of port 2260 through flap valve 2262 positioned above the teller side positioned access chamber assembly 100. Once carrier 2104 travels past valve 2262, air pressure rises in the access chamber AC on the teller side. The rise is pressure in the access chamber AC of access chamber assembly 100 causes the access door device 206 to be forced radially outward ("forward") in a direction away from pocket carrier 158 such that the angled side bars are moved closer to the seal bars (preferably the lip seals are of a softer material than the seal bars such as a relatively harder plastic seal bar pushing on a rubber material lip seal causing lip seal compression). This "forward" adjustment is again facilitated by the clearance provided by the door and radial bearing surfaces (see FIGS. 5A and 5B). That is, the access cover door is driven radially outward in a common direction as the direction of increased divergence of the angled interior wall surfaces (and thus opposite of the direction of angled wall surface convergence increase). Preferably the lip seal edge points 274 for diametrically opposing lip seals 200 and 202 are positioned on the more convergent side of the transverse line TL extending through an intermediate region of lip seal bars 224 and 226. Accordingly, the angled surfaces of the sealing means and the radial bearing clearance work together to provide a highly effective seal when needed while avoiding a need for hard interference type seals (e.g., an interference fit seal arrangement whenever the sealing components are brought together at the time of access door closure). Also, under the seal means of the present invention and since the outward pressure in chamber AC pushes radially outward generally evenly on all points of contact therewith there is not needed a detent to hold the door closed as the seal means of the present invention avoids any tangential torque development on the access door.

Figure 10:
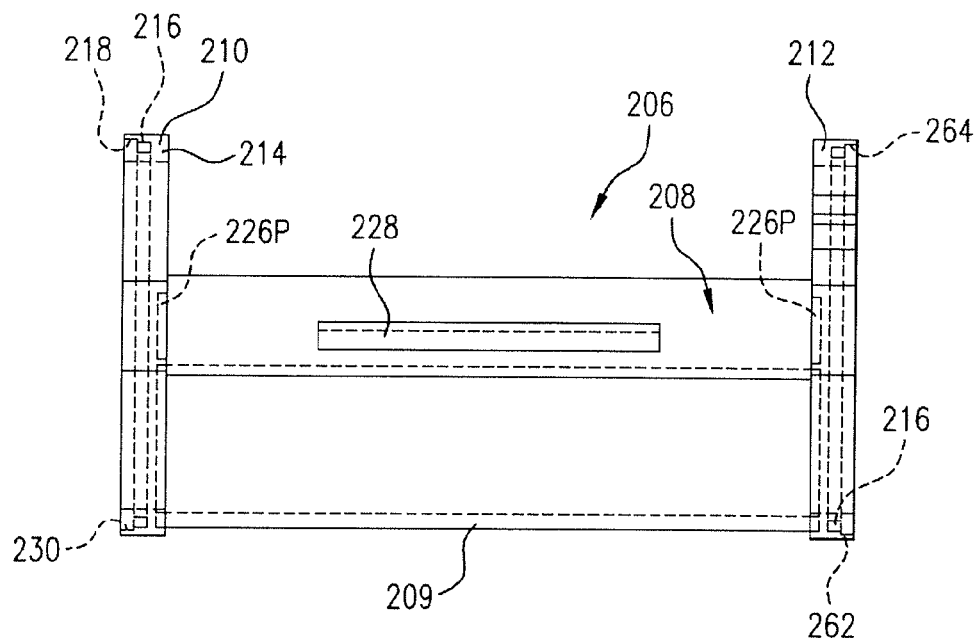
FIG. 10 shows a side elevational view of an access cover door alone.
Figure 12:
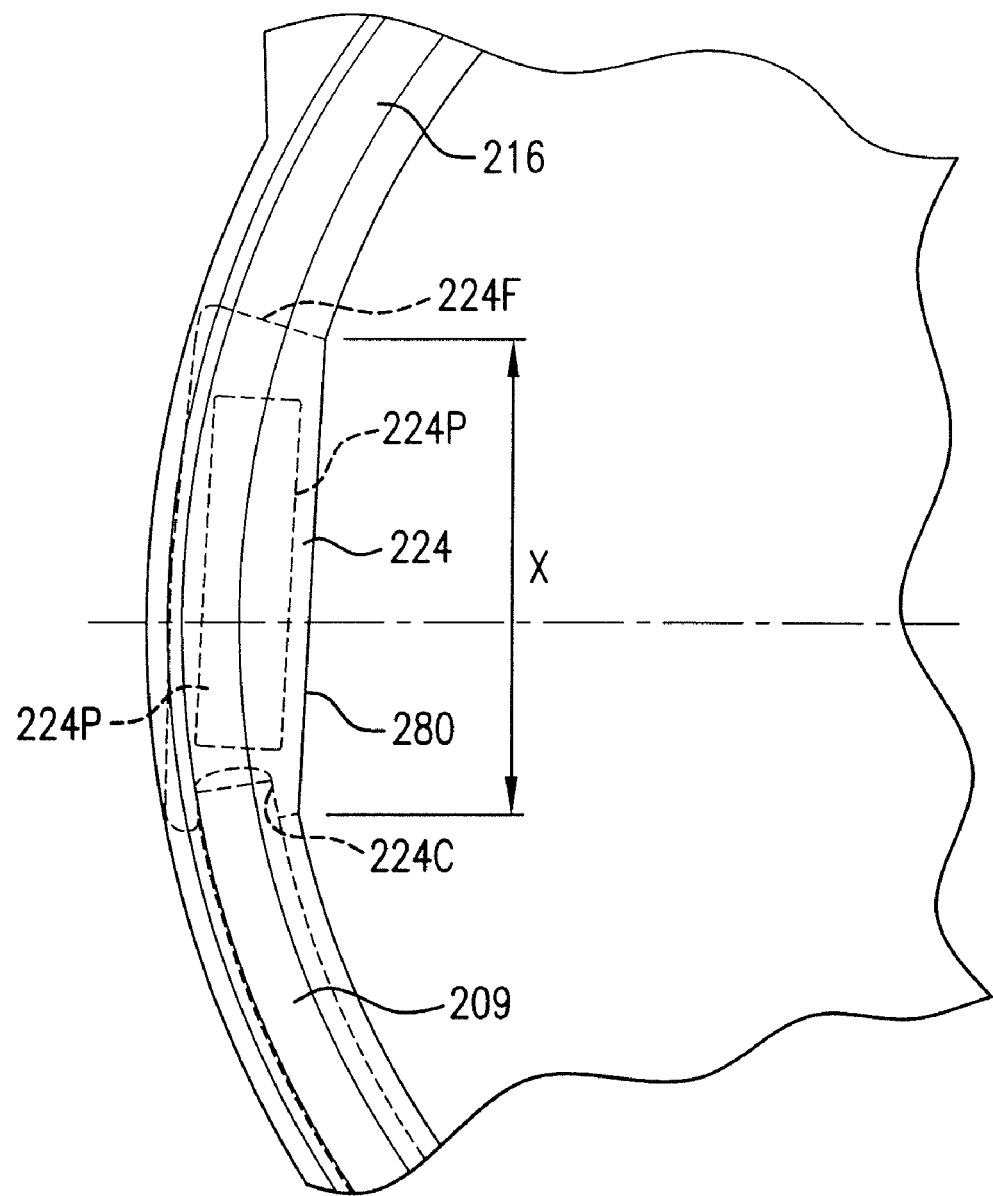
FIG. 12 shows a left end enlarged view of that which is shown in FIG. 11.

With reference to FIGS. 10 to 13 there is provided additional illustration of access cover device 206 alone with FIG. 10 showing device 206 in a side elevational view with the top ring 210 to left and bottom ring 212 to right with a preferred length being 6 to 18 inches with 10 inches being representative of a preferred embodiment. As seen, framework 208 comprises the upper and lower rings 210, 212 as well as the vertical seal bars 224 and 226. Projections 226P (top and bottom) are also shown extending into their respective cavities in upper and lower rings 210 and 212. There can also be seen the flange wall 218 having interior bearing surface 230 for ring 210 and flange wall 262 for lower ring 212 with interior bearing surface 264 and similar double stack O-ring reception cavity 216'. Handle 228 is shown extending out from seal bar 226 with a finger grasp recess FG on one side. The aforementioned ring diameter D can also be seen in FIG. 6 as well as the straight, tapered interior surface 280 of seal bar 224 and straight, tapered interior surface 281 having upper edges with points represented by S1 and S2 with a parallel line to TL that extends through points S1 and S2 being preferably about 4 to 6 inches with 5 inches being representative. The distance X of the tapered surfaces is preferably about 1 to 2 inches as in about 1.25 to provide for suitable enhanced compression during pressurized contact with lip seals 200 and 202. FIGS. 12 and 13 also show in clearer fashion how each of bar seals 224 and 226 have a C-shaped channel 224C and 226C which receives a respective vertical edge of the preferably translucent or transparent door facing 209. The opposite ends of vertical seal bars 224 and 226 is a flat face 224F and 226F which has a divergent, radial out taper to better accommodate the changeover from the flat, tapered surfaces 280 and 281 to the circumferential curvature of the upper and lower rings 210 and 212.

Also, the present invention is not intended to be limited to the embodiments that are presented herein which are but some of examples of the featured invention. As a few non-limiting additional examples, the present invention is further inclusive of designs featuring a reversal or mixing of the seal components as in providing the means for increasing the compression level upon pressurization (e.g., tilted seal surfaces) on alternate or reverse members of the access cover and access cover support combination. Alternatively, the pressure can be used to (alternately or additionally) move a component of the access cover support structure or an associated component to achieve a change in bearing clearance relative to the access cover and/or an increase in the sealing effect of the sealing means (e.g., a slide adjustment in the access cover support structure relative to another transport system support component or a channeling of transfer system pressure to achieve an inward radial movement in a component associated with the access cover support). Furthermore, while the present invention is well suited for use with a radial out pressure generation force on the access cover and a rotation of the access cover about an axis of elongation of the pocket structure, other arrangements are also featured under the present invention as in a vertical slide access cover rather than a rotation access cover as each benefits from an excess clearance adjustment spacing and/or a shape induced seal level increase. However, with a vertical slide door arrangement there is introduced a potential need for an upper seal in addition to, for example, vertical seal component pairs which upper seal can require the addition of an added seal extension (e.g., an upper seal extension to close off the vertical slide access slot which can re-introduce some (but not all) of the stick and noise generation problems associated with conventional vertical slide access door embodiments). In other words, the upper and lower ring access cover frame arrangement of the illustrated embodiments has the added benefit of upper and lower end seal containment provided by the above described O-ring seal sets (222, 223 in FIG. 5) which are self-contained at each end of the access chamber assembly and which avoid air escape and loss of radial pressure on the access cover which leads to the tight seal along the lip seal-seal bar seal component sets. This being achieved again without a significant degrading of ease in rotation of the access cover (e.g., the combination of a low friction plastic contact O-ring and an underlying elastomeric spring force generating O-ring provides easy slide contact and a high seal quality at the upper and lower ends of the access cover/access cover support interface).

What is claimed is:

1. An access chamber assembly for use in a carrier transport system, comprising:
a support structure with a carrier reception chamber;
an access cover adjustably supported by said support structure between an open, access-to-carrier state and a closed state relative to said reception chamber;
a seal assembly comprising a first seal component supported by said support structure and a second seal component supported by said access cover, and
wherein said support structure includes a bearing surface and said access cover includes a bearing surface with an intentional excess clearance space provided between said bearing surfaces for ease in relative adjustment of said access cover relative to said support structure, and
wherein said intentional clearance allows for a radial shifting between said support structure and said access cover during a period of pressurization within the reception chamber whereupon said seal components are brought into high level sealing contact, and wherein said second seal component has a tapered surface which, when radially adjusted by the pressurization, increases an amount of sealing contact relative to said first seal component based on a shape of the tapered surface.

2. An access chamber assembly for use in a carrier transport system, comprising:
a support structure with a carrier reception chamber;
an access cover adjustably supported by said support structure between an open, access-to-carrier state and a closed state relative to said reception chamber;
a seal assembly comprising a first seal component supported by said support structure and a second seal component supported by said access cover, and
wherein said support structure includes a bearing surface and said access cover includes a bearing surface with an intentional excess clearance space provided between said bearing surfaces for ease in relative adjustment of said access cover relative to said support structure, and
wherein said intentional clearance allows for a radial shifting between said support structure and said access cover during a period of pressurization within the reception chamber whereupon said seal components are brought into high level sealing contact,
wherein said support structure includes a pocket structure with an interior region defining said carrier reception chamber, and said pocket structure having first and second side edge regions with respective seal extensions and with one of said seal extensions providing said first seal component, and said pocket structure having a back wall structure extending between said side edge regions on a first pocket structure side and an opening between said first and second side edge regions on a second pocket structure side, and wherein said access cover is designed to slide within the excess clearance space between the closed state wherein said access cover closes off the opening of said pocket structure, and said open, access-to-carrier state.

3. The access chamber assembly of claim 2 wherein said seal extensions provided at said first and second side edge regions of said pocket structure are fixed in position, and wherein said access cover has first and second sides with edge seal bars with one of said edge seal bars providing said second seal component, and said edge seal bars each having a tapered surface designed to radially adjust with access cover radial adjustment, upon pressurization and relative to the excess clearance, into an increased seal state relative to said seal extensions of said pocket structure when said access door is closed.

4. The access chamber assembly of claim 3 wherein said access cover rotates relative to said pocket structure when going between the states of open and closed.

5. The access chamber assembly of claim 3 wherein said edge seal bars have tapered surfaces that taper inward in converging fashion toward the back wall structure of said pocket structure and taper outward in diverging fashion toward the opening of said pocket structure when the access door is in the closed state.

6. The access chamber assembly of claim 3 wherein said tapered surfaces are arranged as to increase spacing at one side of said pocket structure and decrease spacing at an opposite side of said pocket structure during an initial adjustment of said access cover out of a closed state, with said excess clearance providing for a relative shift of said access cover to reduce the increased spacing at the one side and increase the spacing at the opposite side subject to a tapered surface induced spacing decrease to promote clearance between the tapered edge seal bar and adjacent seal extension on the opposite side upon rotation of said access cover relative to said pocket structure.

7. The access chamber assembly of claim 1 wherein said access cover includes a first ring with bearing wall defining said bearing surface of said access cover and a second ring with a bearing wall defining a second bearing surface associated with said access cover, and said support structure includes a first peripheral edge for contact with said first ring upon radial shifting of said access cover relative to the excess clearance and a second peripheral edge for contact with said second ring upon radial shifting of said access cover relative to the excess clearance.

8. The access chamber assembly of claim 7 wherein the second seal component associated with said access cover includes a seal bar extending between said first and second rings and forming, together with said first and second rings, an access chamber frame structure, and wherein said seal assembly includes a third seal component which is comprised of a seal bar extending between said first and second rings and parallel with said first seal bar to define between said seal bars an access opening to said access chamber.

9. The access chamber assembly of claim 8 wherein said seal assembly includes a fourth seal component which is supported on said support structure and extends parallel with said first seal component also supported on said support structure, and said seal bars have interior tapered surfaces that are inclined so as to increase seal pressure in a non-linear manner due to the taper upon an internal pressurization forcing said access cover radially outward and into contact with said second and third seal components.

10. The access chamber assembly of claim 9 wherein said support structure includes a carrier pocket with base floor with gas flow port and flow control valve controlling flow in the gas flow port, and said first and fourth seal components are lip seals that are fixed to free edges of said carrier pocket extending up from said floor and positioned for seal contact upon said access cover radially shifting within the excess clearance.

11. The access chamber assembly of claim 10 wherein said seal components are free from sealing contact until an internal pressurization causes said access cover to radially shift within said excess clearance.

12. The access chamber assembly of claim 7 wherein said access cover includes a semi-cylindrical door facing of transparent or translucent material extending between said first and second rings.

13. The access chamber assembly of claim 1 wherein said access cover rotates relative to said support structure when going between the states of open and closed.

14. The access chamber assembly of claim 1 wherein said first seal component has a tapered sealing surface, and wherein the excess clearance is relied upon to enable a shifting of said access cover relative to said support structure to clear the tapered surface of said first seal component in going from a closed access cover state to an open access cover state.

15. The access chamber assembly of claim 13 wherein said seal components are free from sealing contact until an internal pressurization causes said access cover to radially shift within said excess clearance.

16. The access chamber assembly of claim 1 wherein said support structure includes means for attachment to a carrier transfer tube of the carrier transport system, and said support structure comprises a carrier pocket with an open top sized for carrier pass through, a closed back wall side, an open forward side covered by said access cover when in the closed state, and a bottom region with a carrier transport flow passageway.

17. The access chamber assembly of claim 1 wherein said tapered surface tapers at an angle of 2° to 8°.

18. The access chamber assembly of claim 1 wherein the access cover is pivotably supported by said support structure and is manually adjustable between an open carrier access state and a closed state.

19. An access chamber assembly for use in a carrier transport system, comprising:
   a support structure with a carrier reception chamber;
   an access cover adjustably supported by said support structure between an open, access-to-carrier state and a closed state relative to said reception chamber;
   a seal assembly comprising a first seal component supported by said support structure and a second seal component supported by said access cover, and
   wherein said support structure includes a bearing surface and said access cover includes a bearing surface with an intentional excess clearance space provided between said bearing surfaces for ease in relative adjustment of said access cover relative to said support structure, and
   wherein said intentional clearance allows for a radial shifting between said support structure and said access cover during a period of pressurization within the reception chamber whereupon said seal components are brought into high level sealing contact,
   wherein said support structure includes a base and a carrier pocket secured to said base and extending out from said base, and said carrier pocket having a wall with free edges between which are formed a carrier reception opening, and said seal assembly comprises a pair of first seal components in the form of lip seals respectively secured to the free edges of said carrier pocket, and said access cover comprising a semi-cylindrical body with spaced apart free edges and which semi-cylindrical body rotatively rests on said base, and said seal assembly further comprises a pair of second seal components in the form of seal bars defining the free edges of said semi-cylindrical body, and said lip seals and seal bars being arranged such that upon a positioning of the access cover in a covering state over the carrier reception opening and a pressurization of the access chamber, said access cover adjusts due to the excess clearance space provided and said seal bars adjust together with the access door into a greater seal state with the lip seals.

20. A pneumatic carrier transport system, comprising:

an access chamber assembly comprising:

the access chamber assembly of claim 19;

a carrier transit tube network;

a flow supply tube system in fluid communication with said carrier transit tube network and said access chamber assembly; and a flow supply generator in fluid communication with said flow supply tube system.

\* \* \* \* \*